United States Patent
Jain et al.

(10) Patent No.: US 7,058,004 B2
(45) Date of Patent: Jun. 6, 2006

(54) COMMUNICATION SYSTEM USING ORTHOGONAL WAVELET DIVISION MULTIPLEXING (OWDM) AND OWDM-SPREAD SPECTRUM (OWSS) SIGNALING

(75) Inventors: Vijay K. Jain, Temple Terrace, FL (US); Brent A. Myers, Palm Bay, FL (US)

(73) Assignee: University of South Florida, Tampa, FL (US)

( * ) Notice: Subject to any disclaimer, the term of this patent is extended or adjusted under 35 U.S.C. 154(b) by 689 days.

(21) Appl. No.: 09/864,676

(22) Filed: May 24, 2001

(65) Prior Publication Data

US 2002/0181388 A1 Dec. 5, 2002

Related U.S. Application Data

(60) Provisional application No. 60/289,589, filed on May 7, 2001.

(51) Int. Cl.
*H04J 11/00* (2006.01)

(52) U.S. Cl. .................. 370/204; 370/208; 375/240.19
(58) Field of Classification Search ......... 370/203–208; 375/240.19; 708/317, 400
See application file for complete search history.

(56) References Cited

U.S. PATENT DOCUMENTS 6,259,728 B1 * 7/2001 Sharma et al. .............. 375/223
6,581,081 B1 * 6/2003 Messerly et al. ........... 708/322

OTHER PUBLICATIONS

B.G. Negash and H. Nikoobar, "Wavelet–Based Multicarrier Transmission Over Multipath Wireless Channels", Electronics Letters, Oct. 12, 2000, pp. 1787–1788.*
Weimin Yang, Guangguo Bi, and Tak–Shing P. Yum, "A Multirate Wireless Transmission System Using Wavelet Packet Modulation", IEEE, Mar. 1997, pp. 368–372.*
V.K. Jain, "OWSS Multiple–Access System For 100 Mbps Wireless LANs", IEEE, Jan. 2001, pp. 1471–1475.*
V.K. Jain, "Hybrid Wavelet/Spread–Spectrum System For Broadband Wireless LANs", IEEE, Sep. 2001, pp. IV–554–IV–557.*
M. Vetterli and J. Kovacevic, "*Wavelets and Subband Coding*", Prentice–Hall, 1995, Chapter 3, pp. 92–200.
V.K. Jain, "Unified Approach to the Design of Quadrature–Mirror Filters", *Proc. IEEE Int. Conf. On Acoustics Speech and Signal Processing*, May 1997, pp. 2085–2088.
H. D. Li, and V.K. Jain, "An Approach to the Design of Discrete–Time Wavelets", *Proc. SPIE Conf. AeroSense '96*, vol. 2750, Apr. 1996, pp. 169–179.
L. Andrew, V. T. Franques, and V.K. Jain, "Eigen Design of Quadrature Mirror Filters", *IEEE Trans. On Circuits and Systems II: Analog and Digital Signal Processing*, Sep. 1994, pp. 754–757.
V.K. Jain, and R. E. Crochier, "Quadrature–Mirror Filter Design in Time Domain," *IEEE Trans. On Acoustics Speech and Signal Proc.*, Apr. 1984, vol. ASSP–32, pp. 353–361.

\* cited by examiner

*Primary Examiner*—Ricky Ngo
*Assistant Examiner*—Duc Duong
(74) *Attorney, Agent, or Firm*—Smith & Hopen, P.A.; Thomas E. Toner

(57) ABSTRACT

An orthogonal wavelet division multiplexing (OWDM) communication system including a synthesis section and a channel interface. The synthesis section includes a filter pair bank with multiple inputs and an output that provides an OWDM signal. Each input receives a corresponding symbol of a supersymbol, where the symbols are from a selected modulation scheme. The synthesis section generates the OWDM signal as a combination of weighted OWDM pulses, where each weighted OWDM pulse represents of a symbol of the supersymbol. An OWDM Spread Spectrum (OWSS) communication system that uses broad-time and broadband pulses generated from a family of OWDM pulses together with a set of orthogonal PN code vectors. The OWSS pulses are mutually orthogonal and allow multi-user operation. Each user is assigned an OWSS pulse corresponding to a particular PN code. OWSS enables high rate operation for wireless channels with the use of an equalizer with FE and DFE sections.

58 Claims, 31 Drawing Sheets

COMMUNICATION SYSTEM USING ORTHOGONAL WAVELET DIVISION MULTIPLEXING (OWDM) AND OWDM-SPREAD SPECTRUM (OWSS) SIGNALING

CROSS REFERENCE TO RELATED APPLICATIONS

The present application is based on U.S. Provisional Application entitled "A Communication System Using Orthogonal Wavelet Division Multiplexing (OWDM) and OWDM-Spread Spectrum (OWSS) Signaling", Application No. 60/289,589 filed May 7, 2001, which is hereby incorporated by reference in its entirety.

FIELD OF THE INVENTION

The present invention concerns communication systems, and more particularly relates to a communication system using orthogonal wavelet division multiplexing (OWDM) and OWDM-spread spectrum (OWSS) signaling.

DESCRIPTION OF RELATED ART

Interest in broadband wireless communications is clearly in evidence as illustrated by the explosion in the number of advance products, services and standards that have recently emerged. The IEEE 802.11a standard, for example, uses Orthogonal Frequency Division Multiplexing (OFDM) to provide bit rate capabilities of 6 Megabits per second (Mbps) to 54 Mbps. The shortcomings of OFDM include its large crest factor and its inherent blocked nature incurring a discontinuous pipelined configuration. For future wireless applications, these shortcomings substantially limit the use of OFDM. Indeed for the future, bit rates of up to 100 Mbps and greater are being contemplated for various applications including wireless local area networks (WLANs). Another popular approach, namely Code Division Multiple Access (CDMA), suffers from other kinds of disadvantages including a larger footprint along the frequency axis and the need for costly rake receivers.

The need for higher bit rates for various business, industry and educational applications is growing, and is expected to continue to grow, at a very vigorous pace.

SUMMARY OF THE INVENTION

An orthogonal wavelet division multiplexing (OWDM) communication system according to an embodiment of the present invention includes a synthesis section and a channel interface. The synthesis section includes a filter pair bank with multiple inputs and an output that provides an OWDM signal. The channel interface is configured to assert the OWDM signal onto a channel. Each input of the synthesis section receives a corresponding symbol of a supersymbol, where the symbols are selected from a predetermined symbol set of a selected modulation scheme. The synthesis section generates the OWDM signal as a linear combination of weighted OWDM pulses, where each weighted OWDM pulse is representative of a corresponding symbol of the supersymbol. In general, the synthesis section receives and processes a stream of symbols to provide successive OWDM signals over successive blocks of time. In this manner, the successive OWDM signals are superposed to produce an overall OWDM signal.

The synthesis section includes one or more stages of wavelet filter pairs. In one embodiment, the synthesis section is a multiple stage filter pair bank including an input stage, at least one intermediate stage and a final stage. The input stage includes a set of wavelet filter pairs, where each pair receives two symbol inputs and provides a pair of outputs. For "n" stages, the number of filters of the input stage is equal to $2^n$, so that the number of filter pairs is $2^n/2$. The input stage further includes a corresponding set of adders, where each has a pair of inputs coupled to a corresponding pair of outputs of the wavelet filter pairs of the input stage. The number of wavelet filter pairs of each intermediate stage is half the number of wavelet filter pairs of a preceding stage. Each wavelet filter pair of each intermediate stage has a pair of inputs coupled to two corresponding outputs of a set of adders of a preceding stage. The final stage includes a wavelet filter pair having a pair of outputs and a pair of inputs coupled to two corresponding outputs of a preceding set of adders. The final stage includes a final adder that has a pair of inputs coupled to the pair of outputs of the final stage wavelet filter pair and an output that provides the OWDM signal that represents the supersymbol. In one configuration, each wavelet filter may be preceded by an up sampler.

A serial to parallel converter may be provided to convert the stream of symbols into sets of supersymbols provided to the inputs of the synthesis section. A clipper circuit may be provided at the output of the synthesis section to limit the magnitude of the OWDM signal to a predetermined peak value. Also a first input of the synthesis section associated with the lowest frequency OWDM pulse may be zeroed to enable AC coupling to reduce or otherwise eliminate drift. The weighted OWDM pulses and the OWDM signal are broad-time. Any one of several different modulation schemes may be employed, such as Quadrature Phase Shift Keying (QPSK) or Quadrature Amplitude Modulation (QAM).

The communication system may be configured as a transceiver in which the channel interface is further configured to receive a channel-modified OWDM signal transmitted via the channel. In this configuration, the system includes an adaptive equalizer, an analysis section and a detection circuit. The adaptive equalizer uses OWDM pulses and an error signal to perform an inverse process of the channel to convert the channel-modified OWDM signal into an estimated OWDM signal. The analysis section is a filter pair bank that performs an inverse function of the synthesis section to convert the estimated OWDM signal from the adaptive equalizer into multiple decision statistics that correspond to and include deviations from the individual symbols of an OWDM supersymbol transmitted via the channel. The detection circuit interprets the decision statistics based on the predetermined symbol set, asserts corresponding estimated symbols of an estimated supersymbol, measures an error of the decision statistics and asserts the error signal to the adaptive equalizer.

The synthesis and analysis sections may each be implemented as a multistage tree-structured quadrature mirror filter bank. The synthesis and analysis sections may each be implemented as a tree structure of low pass filter (LPF) and high pass filter (HPF) pairs. The LPF and HPF pairs may be based on a single prototype filter. The LPF and HPF pairs may be implemented using suitable filters, such as Jain filters or Daubechies filters or the like. For Jain filters, the HPF of the analysis section is alternately sign-negated version of its LPF, the LPF of the synthesis section is identical to the LPF of the analysis section, and the HPF of the synthesis section is the negative of the HPF of the analysis section. For Daubechies filters, the LPF of each filter pair of the analysis section may be the order-reversed LPF of the synthesis section, and the HPF of each filter pair of the analysis section may be the order-reversed and alternately sign-negated HPF of the synthesis section.

The analysis section may include one or more filter pair banks in a similar manner as the synthesis section. In one multiple stage embodiment, the analysis section includes an input stage, an output stage and at least one intermediate stage. The input stage includes a wavelet filter pair having an input receiving the estimated OWDM signal and a pair of outputs. The output stage includes a set of wavelet filter pairs, each having an input coupled to a corresponding one of a pair of outputs of a corresponding wavelet filter pair of a previous stage and a pair of outputs asserting a corresponding pair of the decision statistics. Each intermediate stage includes twice the number of wavelet filter pairs of a preceding stage, where each wavelet filter pair has a pair of outputs and an input coupled to a corresponding one of a pair of outputs of a corresponding wavelet filter pair of a previous stage. In one configuration, each analysis section wavelet filter may be followed by a set of down samplers.

The channel interface may be implemented as a media access control and physical circuit that is configured to communicate via any selected media or a wireless medium. The adaptive equalizer may include a programmable equalizer that is initially adjusted based on reception of multiple known OWDM signals that are transmitted via the channel during a training phase. The adaptive equalizer may further include an adaptation block that initially adjusts the programmable equalizer during the training phase and that updates the programmable equalizer based on the error signal during operation. A parallel to serial converter may be provided that converts each estimated supersymbol into a corresponding stream of estimated symbols at its output.

The OWDM-based embodiments described herein have many advantages arising from the beneficial characteristics of OWDM pulses, including low spectral sidelobes, a relatively long time support and double orthogonality. Such factors lead to reduced interchannel interference and the ability to use simple clipping to deal with the well-known crest factor problem. Further, by controlling the power of the alphabet for each channel, the power spectrum may be suitably controlled, thus creating the potential for approaching the channel capacity even for frequency selective fading channels. Channel coding may be employed to further enhance system performance. The data on the lowest frequency or zero channel may be inhibited and zeroed so that the signal may be AC coupled, thereby eliminating the ill effects of drift. The systems may be configured using a continuous process pipeline.

An orthogonal wavelet division multiplexing (OWDM) spread spectrum (OWSS) communication system includes a transmitter that generates an OWSS signal and a channel interface that is configured to assert the OWSS signal onto a channel. The transmitter includes several sets of multipliers and an adder. In particular, the transmitter includes a first series of multipliers that combines a selected symbol of a predetermined symbol set of a selected modulation scheme with each code of a selected one of a first set of orthogonal code vectors. The transmitter further includes a second series of combiners, where each combines each output of the first set of multipliers with a corresponding OWDM pulse of a first family of doubly orthonormal OWDM pulses. The adder sums together the outputs of the second set of multipliers to provide the OWSS signal.

The first family of doubly orthonormal OWDM pulses may be broad-time pulses. In this case, each code of the orthogonal code vectors spreads the OWDM pulses so that the resulting OWSS signal is a broad-time and broadband signal. The selected modulation scheme may again be any one of several known schemes including QAM. QAM-64, for example, may be employed to achieve a practical 100 Mbps system via a wireless medium. The OWSS communication system may further include a memory that stores the orthogonal code vectors and a digital representation of the first family of doubly orthonormal OWDM pulses.

The OWSS communication system may be configured as a transceiver system in which the channel interface is configured to receive channel-modified OWSS signals transmitted via the channel. In this configuration, the system includes a receiver, which further includes an adaptive equalizer, a correlator bank and adder and a detect and decision feedback (DFB) error block. The adaptive equalizer uses an error signal to perform an inverse process of the channel to convert the channel-modified OWSS signal into an estimated OWSS signal. The correlator bank and adder includes several sets of multipliers and an adder. In particular, the correlator bank and adder includes a third series of multipliers that combines the estimated OWSS signal with each OWDM pulse of a second family of doubly orthonormal OWDM pulses. The second family of doubly orthonormal OWDM pulses are complex conjugates of the first family of doubly orthonormal OWDM pulses. The correlator bank and adder further includes a fourth series of multipliers that combines each output of the third series of multipliers with a corresponding code of a selected one of a second set of orthogonal code vectors. The second adder sums together the outputs of the fourth series of multipliers to provide the decision statistic. The detect and DFB error block interprets the decision statistic based on the predetermined symbol set, asserts an estimated symbol at its output, measures an error of the estimated symbol and asserts the error signal to the adaptive equalizer.

The first and second families of doubly orthonormal OWDM pulses may each be generated by a tree-structured wavelet filter pair bank. The tree-structured wavelet filter pair bank may be a multistage filter bank of wavelet filter pairs. The first and second families of doubly orthonormal OWDM pulses may be the same. The first and second families of doubly orthonormal OWDM pulses may be broad-time pulses. The second set of orthogonal code vectors may be a modified version of the first set of orthogonal code vectors to improve performance. Each code vector of the first and second set of orthogonal code vectors may correspond to one of multiple users of a multiple user system. The first and second set of orthogonal code vectors may be based on Walsh-Hadamard codes.

The OWSS communication system may further include a memory that stores the first and second sets of orthogonal code vectors and digital representations of the first and second family of doubly orthonormal OWDM pulses. The memory may be a single memory device or may include multiple memory devices including separate memories for the transmitter and receiver portions. If the first and second sets of orthogonal code vectors are the same, the memory may store a single set of orthogonal code vectors for transmit and receive functions. The channel interface may be configured as a media access control and physical circuit that communicates via any selected media or a wireless medium. The adaptive equalizer may include a programmable equalizer that is initially adjusted based on the reception of a predetermined OWSS signal (corresponding to a set of symbols that is known and prestored in the memory of the receiver) transmitted across the channel during a training phase. The adaptive equalizer may include an adaptation block that initially adjusts the programmable equalizer, both during the training phase and also during the subsequent operation phase. The adaptive equalizer may include a forward equalizer (FE) and a decision feedback equalizer (DFE), where the adaptation block adjusts both the FE and DFE sections of the equalizer during the training and operation phases. The adjustments to the FE and DFE use the error signal produced by the detect and DFB error block and the DFE uses the estimated output signals to develop a decision feedback signal. The equalizer may optionally contain an adjustable 'delay' block to optimize the performance of the detect and DFB error block.

An orthogonal wavelet division multiplexing (OWDM) spread spectrum (OWSS) communication system according to an embodiment of the present invention includes a memory, a transmitter, and a channel interface. The memory stores a first set of OWSS pulses, where each OWSS pulse is a combination of a selected code vector of a first set of orthogonal code vectors and a first family of doubly orthonormal OWDM pulses. The transmitter combines a symbol of a predetermined symbol set of a selected modulation scheme with a selected OWSS pulse from the memory creating a weighted OWSS pulse that forms an output OWSS signal. The transmitter may further superpose weighted OWSS pulses, corresponding to various symbol intervals, together to provide an overall OWSS signal. The channel interface asserts the OWSS signal onto a channel. The channel interface may be configured for wireless communications. The selected modulation scheme may be any one of several known modulation schemes including QAM, such as QAM-64. The transmitter may be implemented using a set of multipliers and an adder, together with the memory that stores the first set of OWSS pulses.

The OWSS communication system may be configured as a transceiver in which the channel interface is configured to receive a channel-modified OWSS signal from the channel. In this embodiment, a second memory stores a second set of OWSS pulses, where each OWSS pulse is a combination of a selected code vector of a second set of orthogonal code vectors and a second family of doubly orthonormal OWDM pulses. The system further includes an adaptive equalizer, a correlator and a detect and DFB error block. The adaptive equalizer includes an FE that converts the channel-modified OWSS signal into an equalized signal, an adder that subtracts a feedback signal from the DFE and asserts the estimated OWSS signal, a DFE that receives estimated symbols and that provides the feedback signal to the adder, and an adaptation block that uses an error signal to update the FE and the DFE. The correlator combines the estimated OWSS signal with the selected OWSS pulse vector from the second memory and asserts a decision statistic at its output. The detect and DFB error block interprets the decision statistic based on the predetermined symbol set, provides the estimated symbol, measures an error of the estimated symbol and asserts the error signal to the adaptation block.

In the FE and DFE embodiment, a delay device may be provided within the FE or in the signal path to the correlator for improved operation. In one embodiment, the first and second orthogonal code vectors are the same, the first and second families of doubly orthonormal OWDM pulses are the same and the first and second sets of OWSS pulse vectors are the same. In this manner, the same OWSS pulse is used for both the transmitter and receiver portions. A single memory is contemplated for a single transceiver embodiment. The correlator may be implemented with multipliers that generate a plurality of decision statistics and an adder that sums the decision statistics into the asserted decision statistic. The adaptive equalizer may include a programmable equalizer that is initially adjusted based on reception of a plurality of predetermined OWSS signals during a training phase. The adaptation block may initially adjust the FE and DFE during the training phase based on reception of one or more predetermined OWSS signals transmitted across the channel. The adaptation block further adjusts both the FE and DFE during operation. A multiple user system is contemplated in which each code vector of the first and second sets of orthogonal code vectors corresponds to one of multiple users.

The OWSS-based embodiments described herein further build on the beneficial characteristics of OWDM thereby adding additional advantages and benefits. Spreading OWDM pulses using appropriate orthogonal codes results in a multiple user system in a common geographic area. OWSS pulses have both broad-time support and broadband frequency support. Wide time support is beneficial and is as much as it potentially leads to superior crest factor properties, and reduces vulnerability to impulse noise. A wide frequency support leads to inherent robustness to frequency selective fading, thereby permitting high bit-rate operations. Bandwidth efficiency is substantially improved, such as by a factor of 2× as compared to DS-CDMA systems. The OWSS system may be targeted to deliver wireless data rates of 100 Mbps or more and exhibits high bandwidth efficiency with multiple access capability. Further, an OWSS system in accordance with the present invention allows continuously pipelined operation. The OWSS embodiments can be used at very high bit rates even in frequency selective wireless channel environments.

BRIEF DESCRIPTION OF THE DRAWINGS

A better understanding of the present invention can be obtained when the following detailed description of embodiments of the invention is considered in conjunction with the following drawings, in which.

DETAILED DESCRIPTION OF EMBODIMENT(S) OF THE INVENTION

Figure 1:
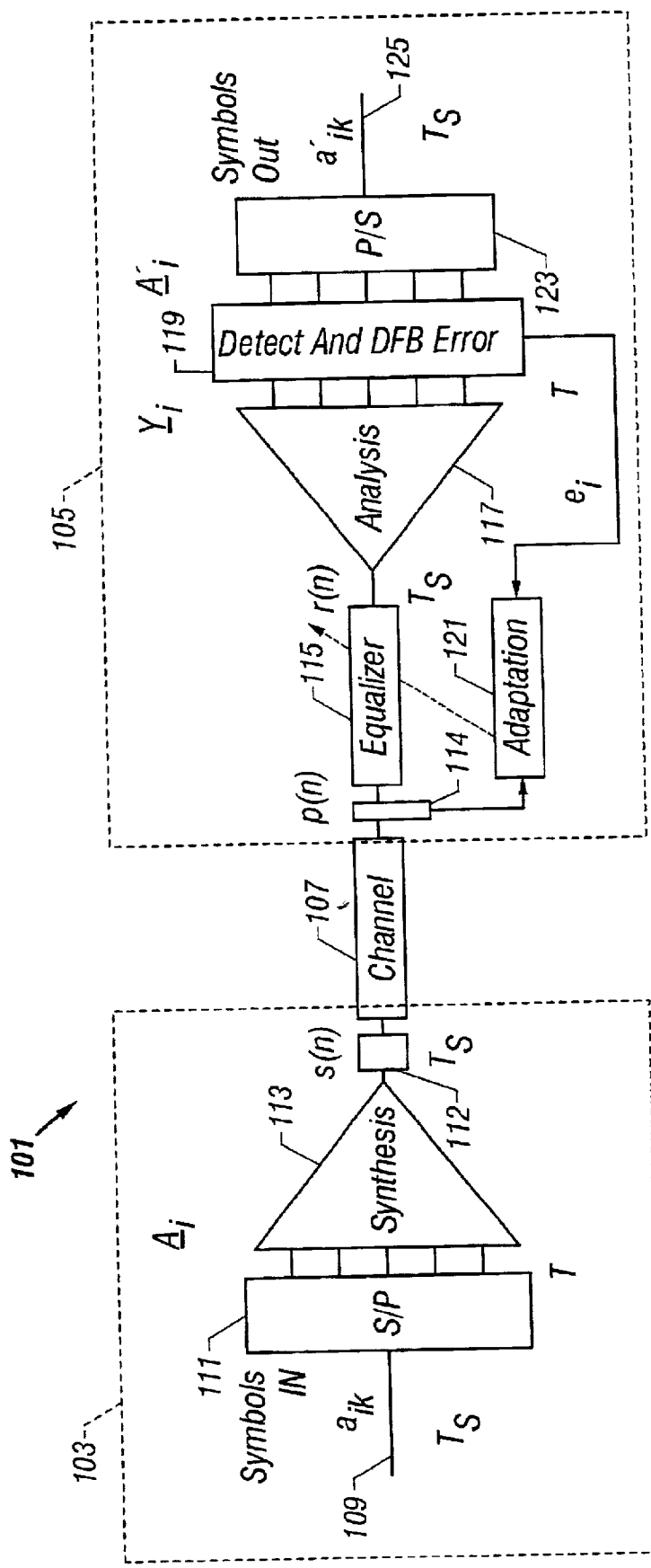
FIG. 1 is a block diagram of a wavelet-based OWDM transceiver system implemented in accordance with an embodiment of the present invention.

FIG. 1 is a block diagram of a wavelet-based transceiver system 101 implemented in accordance with an embodiment of the present invention. The transceiver system 101 includes a wavelet based transmitter 103 and a wavelet based receiver 105 configured to communicate across a channel 107. The channel 107 may be a wireless medium or may be a wired media such as copper or cable. The transmitter 103 includes an input 109 that receives and provides a serial stream of symbols, denoted $a_{ik}$, to the input of a serial to parallel (S/P) converter 111. It is noted that the subscript "i" denotes the i-th supersymbol, denoted $A_i$, of a series of supersymbols and that the subscript "k" denotes an individual symbol of a supersymbol. The supersymbol $A_i$ is a vector of symbols in which $A_1=[a_{i0}\ a_{i1}\ \ldots\ a_{i,M-1}]^T$ where "M" denotes block length and where "T" denotes a supersymbol block interval. In this manner, the S/P converter 111 collects a group of M symbols of each supersymbol from the input symbol stream and provides each symbol of each completed supersymbol $A_i$ to respective inputs of a synthesis section 113. The synthesis section 113 combines the individual symbols of the supersymbol $A_i$ into an orthogonal wavelet division multiplexing (OWDM) signal, denoted as s(n). The parenthetical notation "n" denotes a sample of a stream of OWDM signal samples, where the notation "n" is used interchangeably with another notation "t". It is noted that the symbols "T" and "$T_S$" in the Figures denote clock timing references relative to the supersymbol period and symbol period, respectively.

The OWDM signal is provided to a channel interface 112, which asserts the OWDM signal s(n) onto the channel 107. It is noted that the particular configuration and operation of the channel interface 112 depends on the communication medium or media. For example, for wireless communications, the channel interface 112 includes the appropriate wireless media access control (MAC) protocol and configuration and a corresponding physical (PHY) device. The receiver 105 includes a channel interface 114 that detects a transmitted signals p(n) via the channel 107 and that applies the detected signals to the inputs of an equalizer 115 and an adaptation block 121.

The channel interfaces 112, 114 are configured in a complimentary manner and may further be configured in a substantially similar manner as transceivers that include both transmit and receive functions for enabling communications via the channel 107. All references to a "channel interface" herein are intended to include the appropriate circuitry for enabling communications, such as radio circuitry and antenna for enabling wireless communications. For example, for wireless communications, transmitter, receiver or transceiver circuitry is typically included as appropriate depending upon the particular configuration, such as filters, mixers and radio frequency (RF) circuitry for communicating the OWDM signal s(n) via the channel 107. The transmitter circuitry modulates the signal to an RF carrier and the receiver demodulates from the RF frequency to retrieve the transmitted signal. The transmitter 103 and the receiver 105 are shown as portions of separate systems communicating via the channel 107 for purposes of describing the communication process of transmission and reception of an OWDM signal. A typical transceiver, however, includes both of the illustrated transmitter and receiver functions and a common channel interface configured to transmit and receive OWDM signals via the channel 107, such as a single MAC and PHY transceiver configuration.

In the embodiment shown, the equalizer 115 is a linear adaptive equalizer, described further below, that is configured to remove as much error and distortion as possible from the channel-modified input signal p(n) as a result of any channel noise, intersymbol interference (ISI), multipath distortion and/or any other distortion applied by the channel 107 in an attempt to retrieve the original transmitted signal s(n). The equalizer 115 asserts or provides a corresponding estimated signal r(n) which is intended to be a generally good replica of the OWDM signal s(n) asserted on the channel 107 by the transmitter 103.

The signal r(n) is provided to the input of an analysis section 117, which generally performs the inverse process of the synthesis section 113 in an attempt to reconstruct the individual symbols of the original supersymbol $A_i$. The analysis section 117 outputs a set of decision statistics $Y_i$, which is provided to a detect and decision feedback (DFB) error block 119. The set of decision statistics $Y_i$ generally has a similar form as the supersymbol $A_i$ but incorporates error as a result of the affects of the channel 107. The detect and DFB error block 119 processes the received set of decision statistics $Y_i$ and makes calculated decisions to convert the set of decision statistics $Y_i$ into an "estimated" supersymbol $A'_i$ that is intended to represent or be a duplicate of the original supersymbol $A_i$. The apostrophe "'" appended to a signal symbol as used herein denotes a highly accurate estimate of the original signal which has a very low probability of deviation. A deviation means that an error may have occurred, although such symbol errors are quite rare when the signal is an estimated signal with the apostrophe notation. The estimated supersymbol $A'_i$ is provided to a parallel to serial converter (P/S) 123, which converts the estimated supersymbol $A'_i$ into a stream of individual estimated symbols $a'_{ik}$ that is asserted onto an output 125 of the receiver 105. The estimated symbols $a'_{ik}$ are intended to be a duplicate of the original stream of symbols $a_{ik}$ at the receiver 103 and have a very low probability of deviation. The detect and DFB error block 119 compares the estimated symbols $a'_{ik}$ with each decision statistic of the set of decision statistics $Y_i$ and generates an error signal, denoted $e_i$. The error signal $e_i$ may have any one of several formats, but generally includes an error value associated with each decision statistic of the set of decision statistics $Y_i$.

The equalizer 115 is configured as an adaptive equalizer as controlled by the adaptation block 121, which receives the error signal $e_i$ from the detect and detect and DFB error block 119. In the configuration shown, a training phase is initially conducted at power up or initialization in which a set of known OWDM signal samples or the like are asserted by the transmitter 103 onto the channel 107 and received by the receiver 105. The set of known OWDM signal samples may be prestored at both the transmitter 103 and the receiver 105 and used to initially train the equalizer 115. The adaptation block 121 measures the distortion of the received signals by comparing each received signal to a corresponding one of the known OWDM signal samples and initially adjusts the equalizer 115 to offset the measured distortion. In this manner, the equalizer 115 is initially adjusted to correct for the distortions introduced by the channel 107 during the training phase. Thereafter, during normal operation, the detect and DFB error block 119 continuously makes decisions based on the received decision statistics and measures the resulting error caused by the channel 107. The detect and DFB error block 119 continuously provides updated $e_i$ signals to the adaptation block 121, which in turn updates the equalizer 115. In this manner, the adaptation equalizer system continuously tracks the error and distortion of the channel 107 and updates the equalizer 115 accordingly to accurately receive and resolve the received signals even if the characteristics of the channel 107 is unpredictable or otherwise changes over time, which is common for wireless communications. In one embodiment, the ongoing adaptive process is sufficiently accurate so that subsequent training phases may not be necessary after the initial training phase. Alternatively, the training phase may be periodically repeated to update the equalizer 115.

Figure 2:
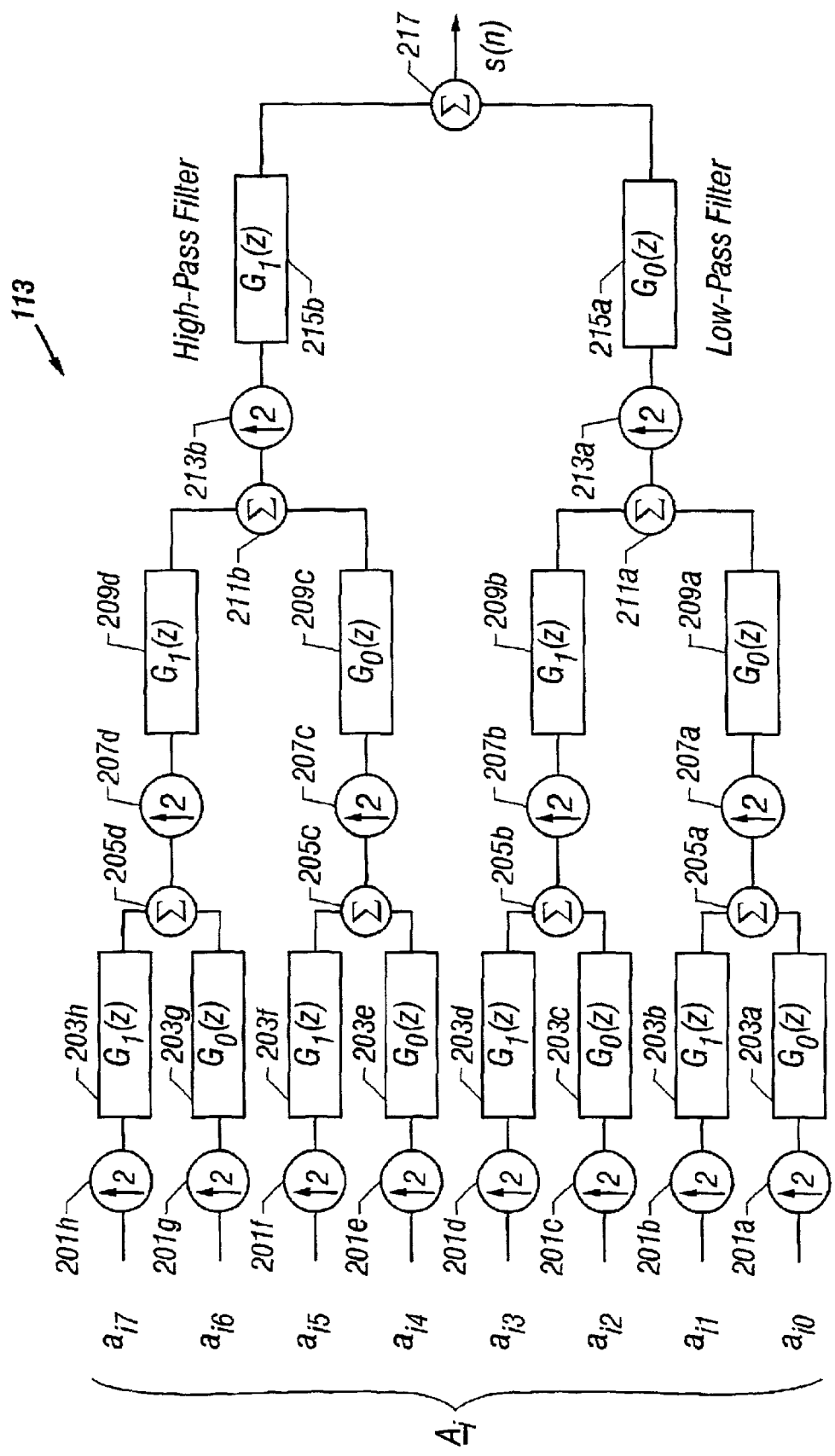
FIG. 2 is a more detailed block diagram of the synthesis section of FIG. 1 in accordance with an embodiment of the present invention.

FIG. 2 is a more detailed block diagram of the synthesis section 113 in accordance with an embodiment of the present invention. The synthesis section 113 is configured as a tree structure or bank of filter pairs. The symbols $a_{ik}$ of the supersymbol $A_i$, individually shown as $a_{i0}$–$a_{i7}$, are each provided to a corresponding input of a set of upsamplers 201. In particular, the respective symbols $a_{i0}$–$a_{i7}$ are provided to the respective inputs of the upsamplers 201a–201h. The respective outputs of each of the upsamplers 201a–201h are coupled to respective inputs of a set of wavelet filters 203. The wavelet filters 203 include a bank of filter pairs, each pair including a low pass filter (LPF) $G_0(z)$ and a high pass filter (HPF) $G_1(z)$. In particular, the output of upsampler 201a is coupled to the input of an LPF 203a and the output of the upsampler 201b is coupled to the input of an HPF 203b. In a similar manner, the outputs of the upsamplers 201c and 203d are coupled to a respective inputs of a pair of low pass and high pass filters 203c and 203d, the outputs of the upsamplers 201e and 203f are coupled to respective inputs of a pair of low pass and high pass filters 203e and 203f, and the outputs of the upsamplers 201g and h are coupled to respective inputs of a pair of low pass and high pass filters 203g and 203h.

The outputs of each LPF and HPF pair 203 are coupled to respective inputs of a set of combiners or adders 205. In particular, the respective outputs of the filter pair 203a and 203b are coupled to respective inputs of an adder 205a, the respective outputs of the filter pair 203c and 203d are coupled to respective inputs of an adder 205b, the respective outputs of the filter pair 203e and 203f are coupled to respective inputs of an adder 205c and the respective outputs of the filter pair 203g and 203h are coupled to respective inputs of an adder 205d. The respective outputs of the adders 205a–203d are coupled to inputs of respective upsamplers 207a–207d. The respective outputs of the upsamplers 207a–207d are coupled to respective inputs of a set of filter pairs 209a–209d, including LPFs 209a and 209c and HPFs 209b and 209d. The respective outputs of the filter pair 209a and 209b are coupled to respective inputs of an adder 211a and the respective outputs of the filters 209c and 209d are coupled to the respective inputs of another adder 211b. The respective outputs of the adders 211a and 211b are coupled to respective inputs of upsamplers 213a and 213b. The output of the upsampler 213a is coupled to the input of a LPF 215a and the output of the upsampler 213b is coupled to the input of a corresponding HPF 215b of a filter pair 215a and 215b. The respective outputs of the filter pair 215a and 215b are coupled to respective inputs of a final adder 217, which asserts the s(n) signal at its output.

The set of input symbols $a_{i0}$–$a_{i7}$ forming the supersymbol $A_i$ may be any one of multiple formats according to the selected type of modulation scheme. In one embodiment, the respective symbols of the supersymbol $A_i$ may simply be binary in which each symbol represents one bit of information. In another embodiment, the selected modulation scheme is Quadrature Phase Shift Keying (QPSK) in which each symbols represents two bits of information for four possible combinations. In another set of embodiments, the selected modulation scheme is Quadrature Amplitude Modulation (QAM), such as QAM-16, QAM-32, QAM-64, QAM-256, etc. For example, for QAM-16 modulation, each of the symbols of the supersymbol $A_i$ includes four bits of information for a total of 16 possible combinations. It is understood that the present invention is not limited to any particular type of modulation scheme and that other modulation schemes are contemplated. QAM-64 includes 6 bits for a total of 64 possible combinations. The format of the individual symbols may be provided in any desired digital format. In one embodiment, each symbol is provided in complex format {a+jb} in which the respective magnitude values "a" and "b" are weighting factors that define the weight of the individual symbol, and where 'j' denotes the square-root of –1.

Each upsampler of the sets of upsamplers 201, 207, and 213 is configured in substantially the same manner to increase the symbol rate from input to output by a factor of two. In one embodiment, each upsampler outputs an input sample followed by a zero sample. It is noted that the S/P converter 111 decreases the clock rate from input to output by a factor of "M" in which the number of symbols per supersymbol M depends on the size of the synthesis section 113. For the 8-input configuration (M=8), the clock rate at the output of the S/P converter 111 is reduced by a factor of eight. Each set of upsamplers increases the clock rate by a factor of two, so that for a three-stage configuration, the clock rate at the output of the synthesis section 113 is the same as the clock rate at the input of the S/P converter 111.

Each LPF $G_0(z)$ of each set of filters 203, 209 and 215 is configured in a substantially identical manner. Likewise, each HPF $G_1(z)$ of each set of filters 203, 209 and 215 is configured in a substantially identical manner. Each pair of filters is a sibling pair of smoothing filters. In one embodiment, each filter pair comprises linear phase quadrature mirror filters (QMFs) designed by Jain et al. Alternatively, each filter pair may be implemented as Daubechies filters in which each filter represents an individual wavelet. Each adder of each of the sets of adders 205, 211 and 217 is configured in a substantially identical manner, such as multipliers (mixer combiners) or adders, so that each adder combines the outputs of a respective filter pair into a single OWDM signal. In this manner, the synthesis section 113 is implemented as a tree-structured filter bank that combines the individual symbols $a_{i0}$–$a_{i7}$ of an input supersymbol $A_i$ into the OWDM signal s(n) at the output of the adder 217.

It is noted that in the three stage configuration shown, the first four inputs $a_{i0}$–$a_{i3}$ are associated with the LPF 215a whereas the last four inputs $a_{i4}$–$a_{i7}$ are associated with the HPF 215b. The first two inputs $a_{i0}$–$a_{i1}$ are associated with the LPF 209a, the next two inputs $a_{i2}$–$a_{i3}$ are associated with the HPF 209b, the next two inputs $a_{i4}$–$a_{i5}$ are associated with the LPF 209c and the last two inputs $a_{i6}$–$a_{i7}$ are associated with the HPF 209d. Of course, each of the inputs $a_{i0}$–$a_{i7}$ are associated with the filters 203a–203h, respectively. If each LPF is associated with binary value "0" and each HPF is associated with binary 1, then the inputs $a_{i0}$–$a_{i7}$ are associated with binarily indexed filter sets 000, 001, 010, 011, 100, 101, 110 and 111, respectively, through the synthesis section 113. Each input may provide a separate channel, where each channel may be allocated to one of multiple users for a multi-user configuration. Thus, each user is allocated one or more channels and a corresponding bandwidth associated with the combined allocated channels.

Figure 3:
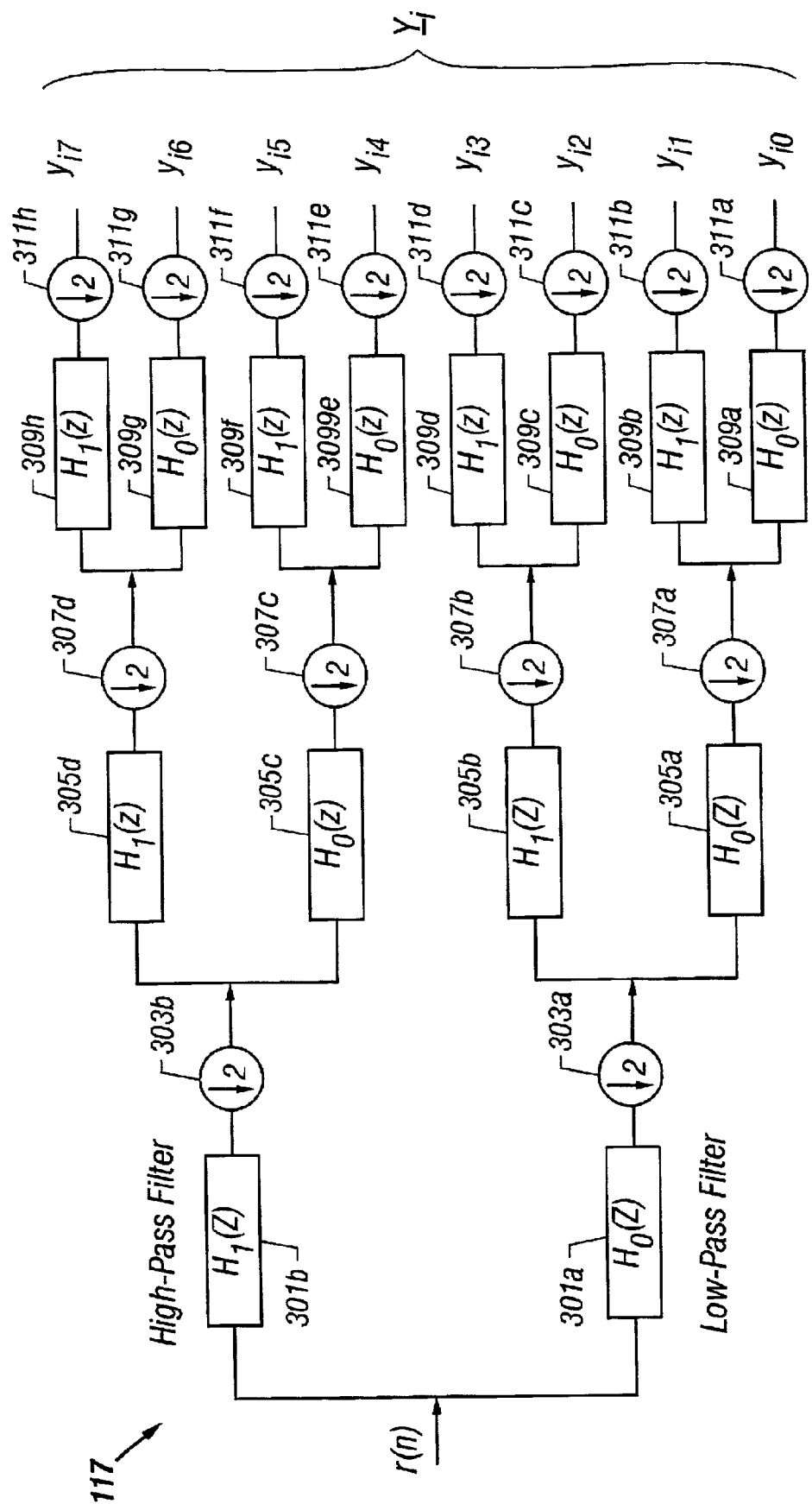
FIG. 3 is a more detailed block diagram of the analysis section of the receiver of FIG. 1.

FIG. 3 is a more detailed block diagram of the analysis section 117 of the receiver 105. The analysis section 117 is also configured as a filter bank in a similar manner as the synthesis section 113. However, the analysis section 117 performs the inverse function of converting the received estimated signal r(n) from the equalizer 115 into individual decision statistics $y_{i0}$ $y_{i1}$ . . . $y_{i,7}$ for (M=8) of the set of decision statistics $Y_i$. The analysis section 117 includes an input pair of filters including an LPF $H_0(z)$ 301a and an HPF $H_1(z)$ 301b that each receive the r(n) signal at respective inputs. The outputs of the filter pair 301a and 301b are coupled to respective inputs of a pair of downsamplers 303a and 303b. The output of the downsampler 303a is coupled to the inputs of an LPF $H_0(z)$ 305a and an HPF $H_1(z)$ 305b. The output of the downsampler 303b is coupled to the inputs of an LPF $H_0(z)$ 305c and an HPF $H_1(z)$ 305d. The respective outputs of the filters 305a, 305b, 305c and 305d are provided to respective inputs of downsamplers 307a, 307b, 307c and 307d. The output of the downsampler 307a is coupled to respective inputs of a pair of LPF $H_0(z)$ and HPF $H_1(z)$ filters 309a and 309b. In a similar manner, the output of the downsampler 307b is coupled to respective inputs of a pair of LPF $H_0(z)$ and HPF $H_1(z)$ filters 309c and 309d, the output of the downsampler 307c is coupled to respective inputs of a pair of LPF $H_0(z)$ and HPF $H_1(z)$ filters 309e and 309f, and the output of the downsampler 307d is coupled to respective inputs of a pair of LPF $H_0(z)$ and HPF $H_1(z)$ filters 309g and 309h. The respective outputs of the filters 309a–309h are coupled to respective inputs of a set of output downsamplers 311a–311h. The respective outputs of the downsamplers 311a–311h provide the set of decision statistics $Y_i$.

The LPFs $H_0(z)$ of the filter sets 301, 305 and 309 are configured in substantially identical manner. Likewise, the HPFs $H_0(z)$ of the filter sets 301, 305 and 309 are configured in substantially identical manner. The LPFs $H_0(z)$ are closely related to the HPFs $H_1(z)$. Also, the H filters [$H_0(z)$ and $H_1(z)$] of the analysis section 117 are closely related to the G filters [$G_0(z)$ and $G_1(z)$] of the synthesis section 113. In one embodiment, the LPF $H_0(z)$ filter is a prototype filter that may be used to derive the other three filters including the HPF $H_1(z)$, the LPF $G_0(z)$ and the HPF $G_1(z)$. The sets of downsamplers 303, 307 and 311 are configured in substantially the same manner and perform the inverse operation of the upsamplers 201, 207 and 213. The sets of downsamplers 303, 307 and 311 divide the signal rate in half, so that the corresponding clock rates are divide by two through each stage from the r(n) input signal to the $Y_i$ output of the analysis section 117. The original eight channels are extracted from the r(n) signal.

FIGS. 4A, 4B, 4C and 4D are each multiple graphic diagrams of respective OWDM pulses for 8-tap, 16-tap, 32-tap and 64-tap cases, respectively, for a corresponding 8, 16, 32 and 64 channels, respectively, using Jain filters, resulting in nearly orthonormal multipulses. FIG. 4E is a multiple graphic diagram of respective OWDM pulses for an 8-tap case using Daubechies filters resulting in orthonormal multipulses. The transceiver system 101, including the synthesis section 113 and the analysis section 117, illustrates the 8-pulse case for 8 channels. In general, however, an M-pulse system includes M inputs for receiving a respective M symbols for each supersymbol $A_i = [a_0 \ . \ . \ . \ a_{M-1}]^T$ with supersymbol block interval T. The number of stages S of an M pulse filterbank is defined by the relationship $M = 2^S$. Thus, the synthesis section 113 and the analysis section 117 each include three stages of filter pairs. Each graphic diagram shows an exemplary OWDM pulse that results by asserting a unitary symbol at one input with a zero-valued symbol provided to all other inputs.

Figure 4A:
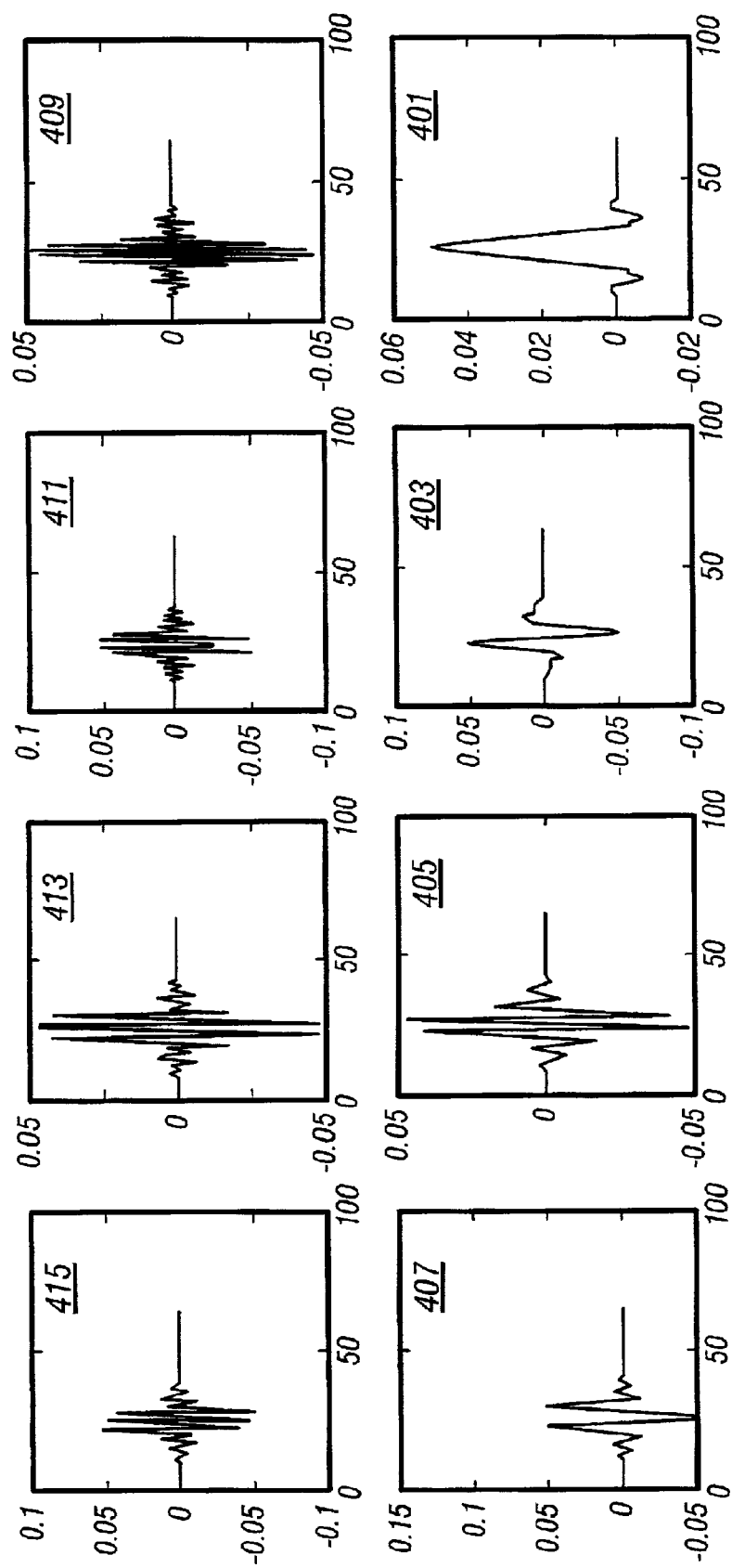
FIGS. 4A, 4B, 4C and 4D are each multiple graphic diagrams of respective OWDM pulses for 8-pulse, 16-pulse, 32-pulse and 64-pulse cases, respectively, corresponding to 8, 16, 32 and 64 channels, respectively.

FIG. 4A includes multiple graphic diagrams illustrating the set of OWDM pulses 401, 403, 405, 407, 409, 411, 413 and 415 for M=8. For example, the first pulse 401 results by asserting a unitary symbol, or 1+j0, at the $a_{i0}$ input of the synthesis section 113 with a zero value applied to all other inputs $a_{i1}$–$a_{i7}$. The second pulse 403 results from a unitary input 1+0j applied to the second input $a_{i1}$ with the remaining inputs receiving a zero value. The remaining OWDM pulses 405–415 are achieved with the unitary input 1+j0 applied to the inputs $a_{i2}$–$a_{i7}$, respectively, one at a time, with the remaining inputs set to zero for each case. It is noted that each of the pulses illustrated 401–415 represent the real portion whereas a corresponding pulse is provided on an imaginary or orthogonal axis. For example, an input of 1+j1 at the $a_{i0}$ input results in the pulse 401 shown and a substantially duplicate pulse along the imaginary axis resulting in an in-phase (I) signal and a quadrature-phase (Q) signal at the output. It is further noted that the magnitude of each OWDM pulse is varied by the magnitude of the corresponding input symbol for both the real and imaginary portions. Thus, an input of 1+j3 at the $a_{i0}$ input results in the pulse 401 shown and a similar pulse along the imaginary axis having an amplitude that is three times greater than the pulse 401.

Figures 1, 4B:
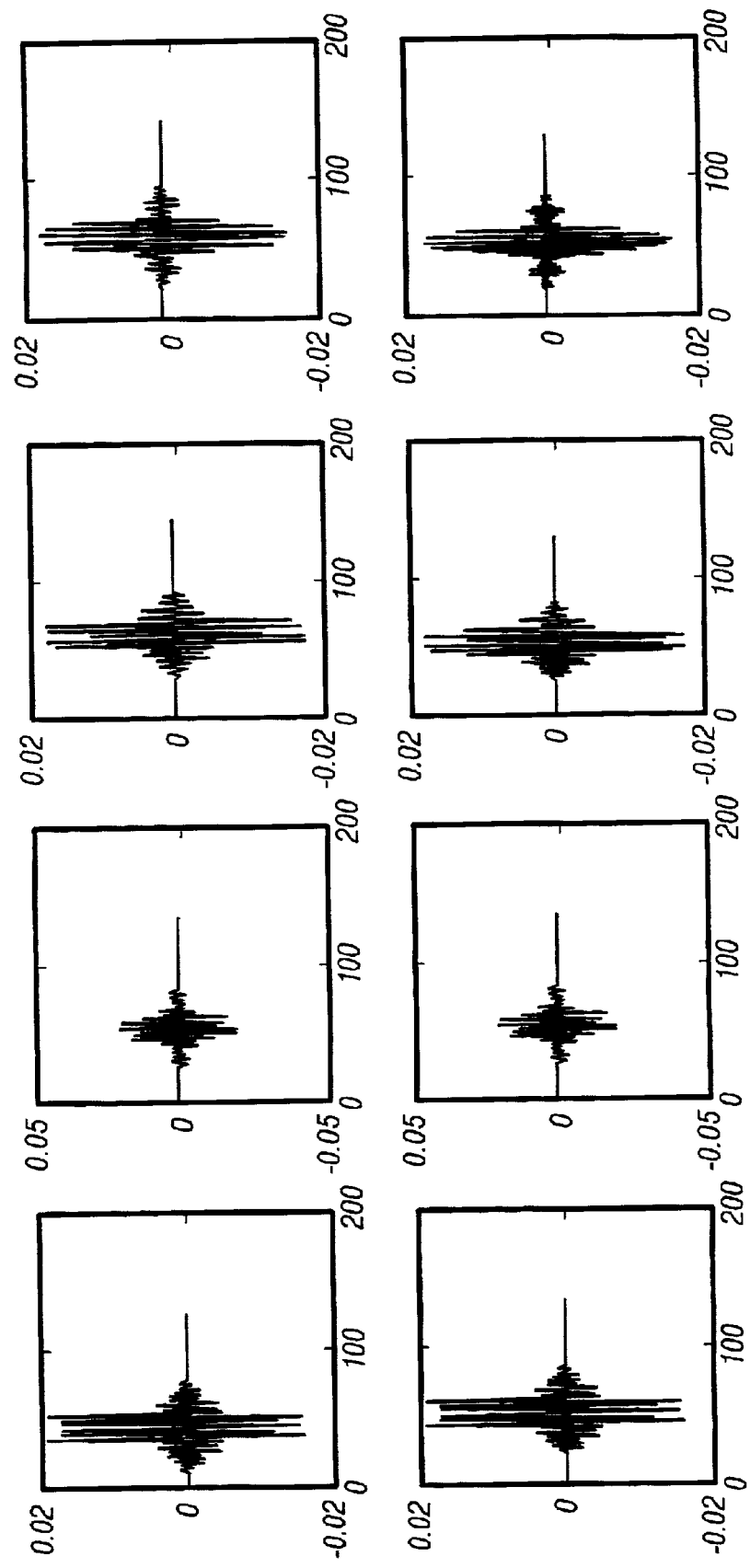
Figures 2, 4B:
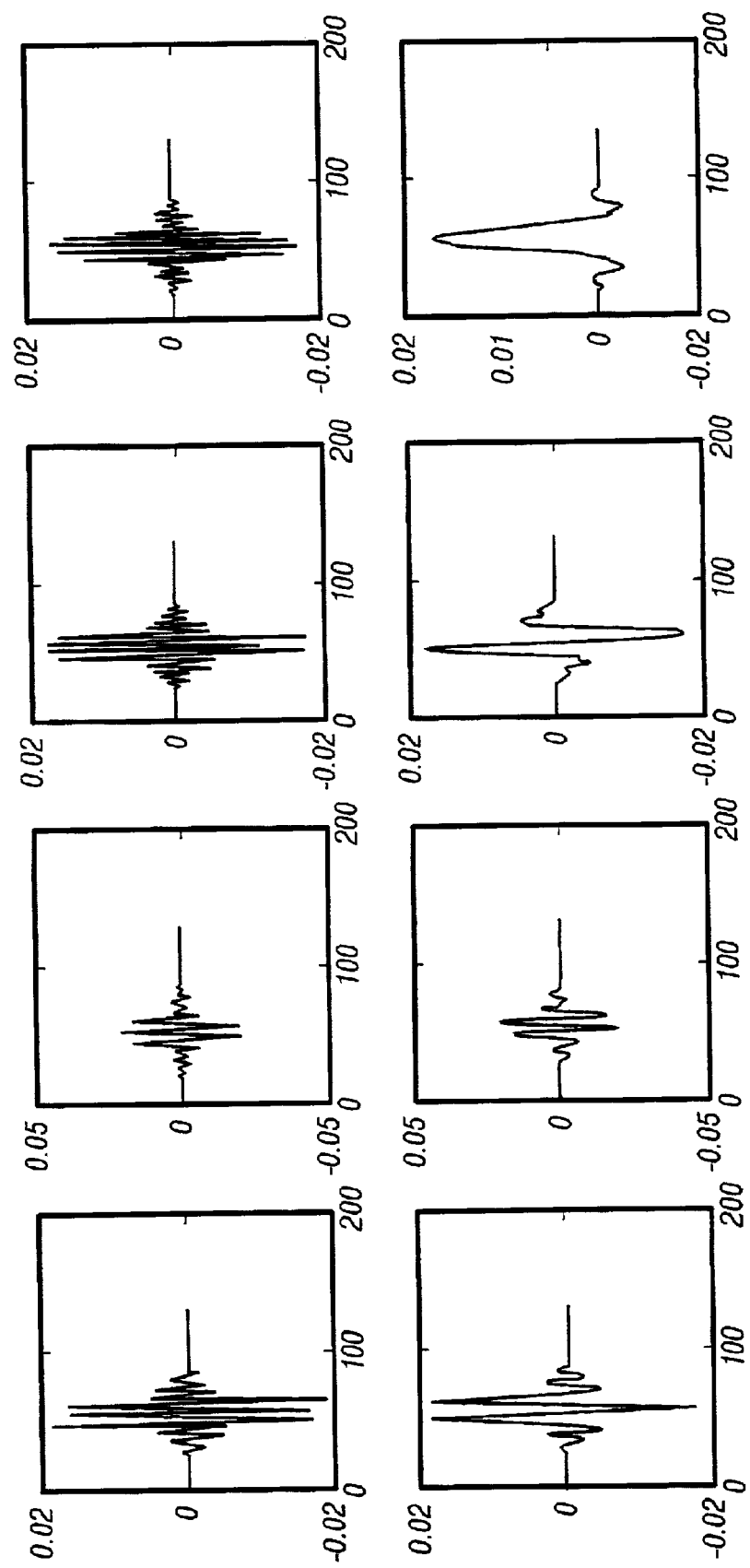
Figures 1, 4C:
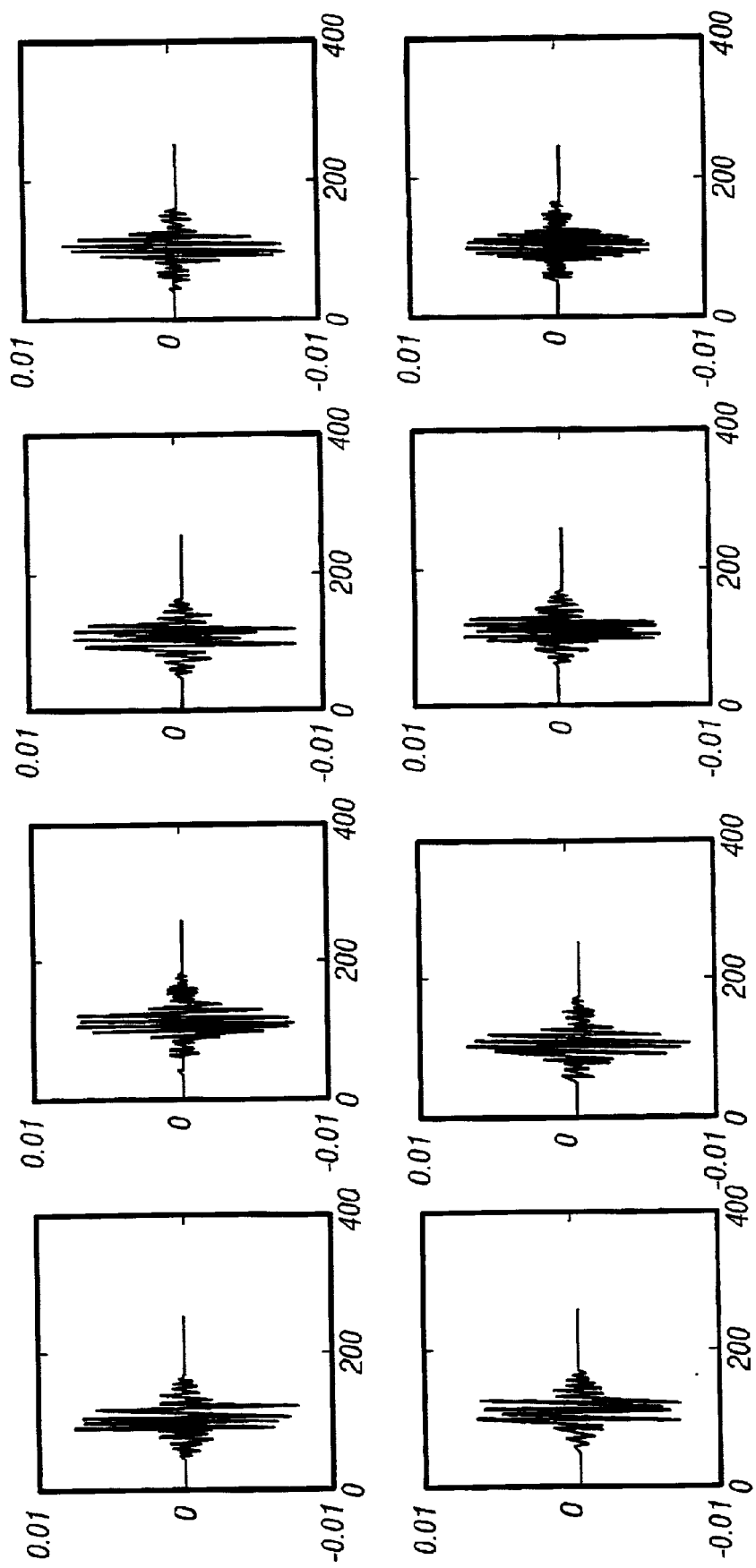
Figures 2, 4C:
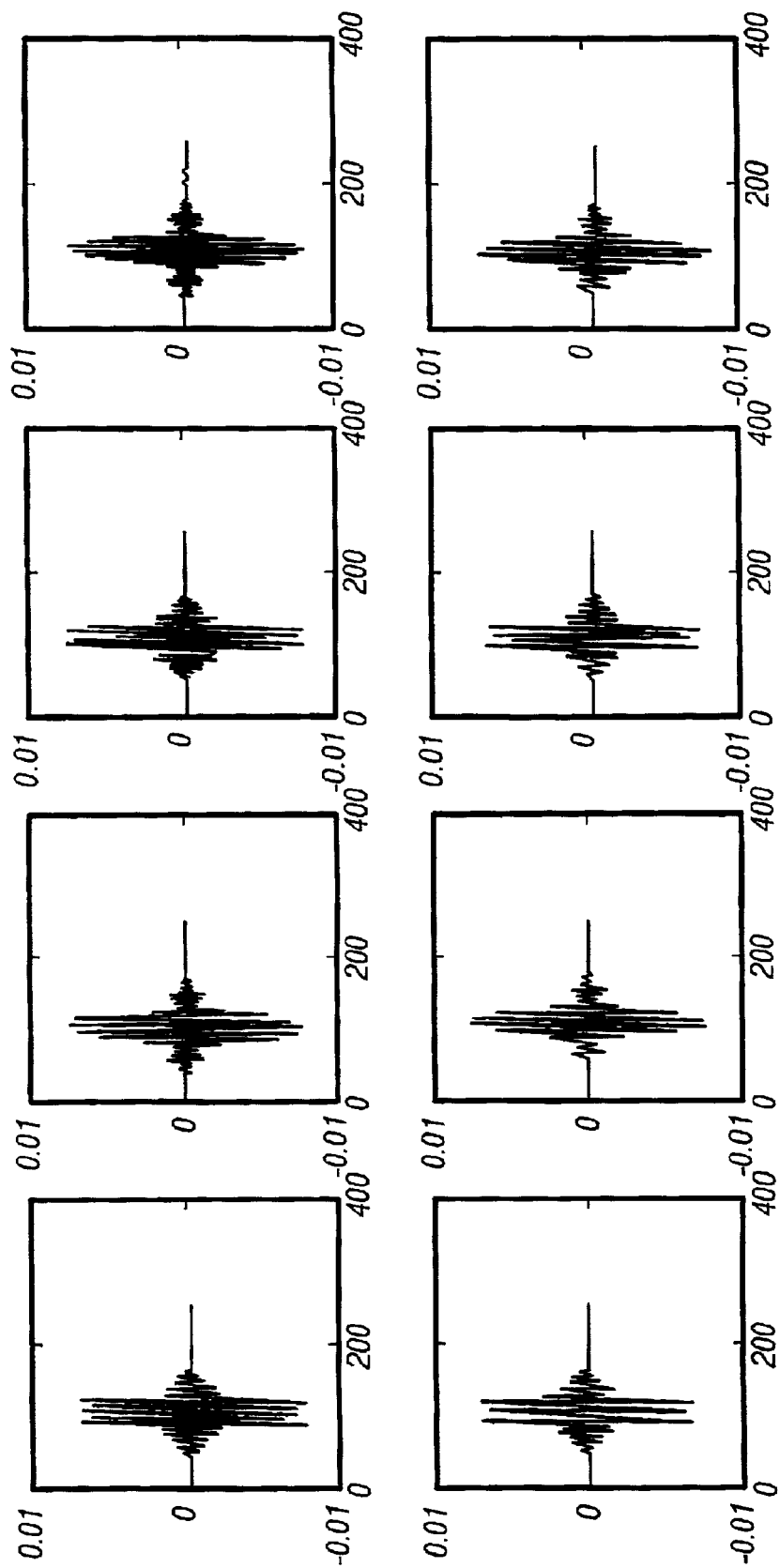
Figures 3, 4C:
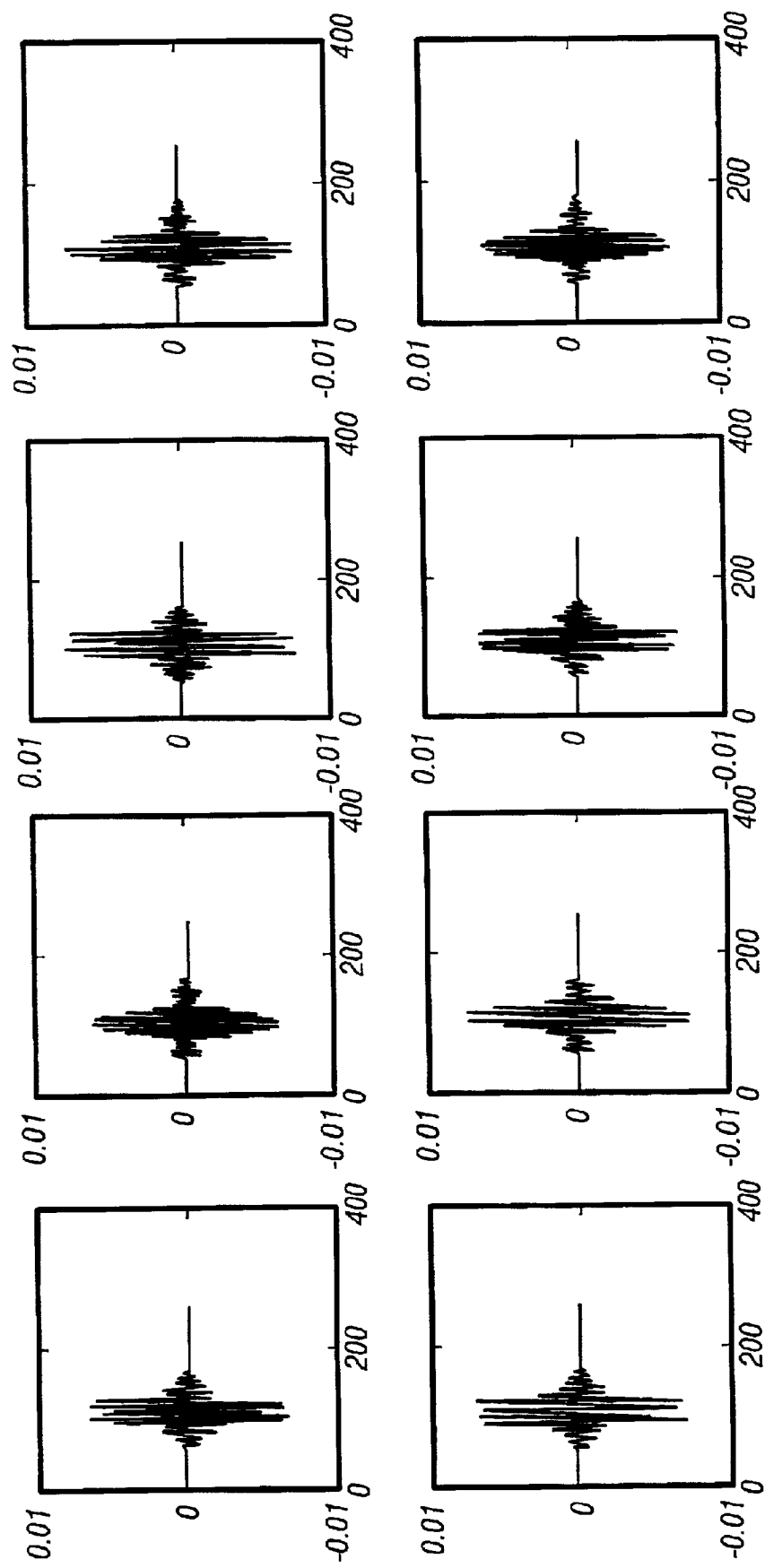
Figures 4, 4C:
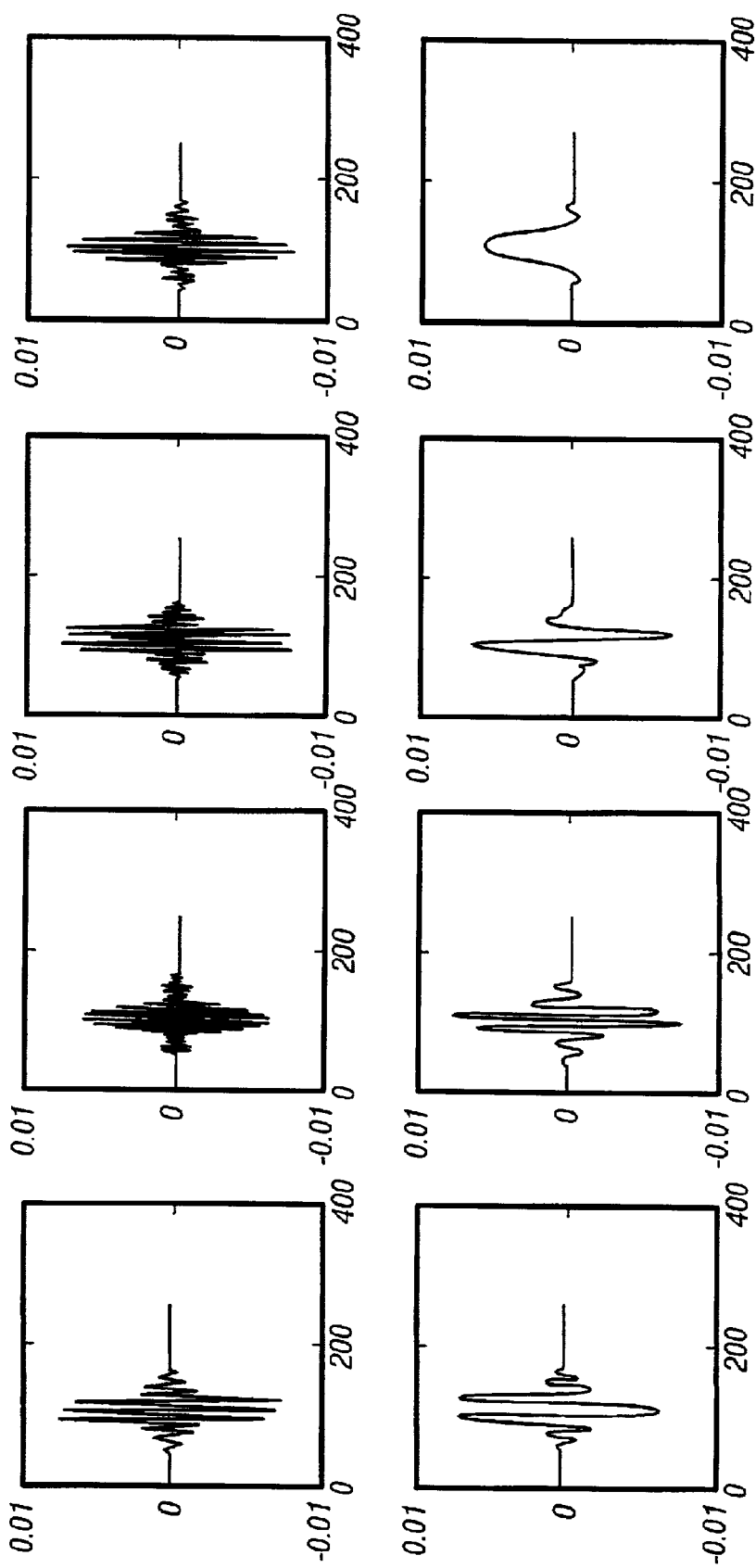
Figures 1, 4D:
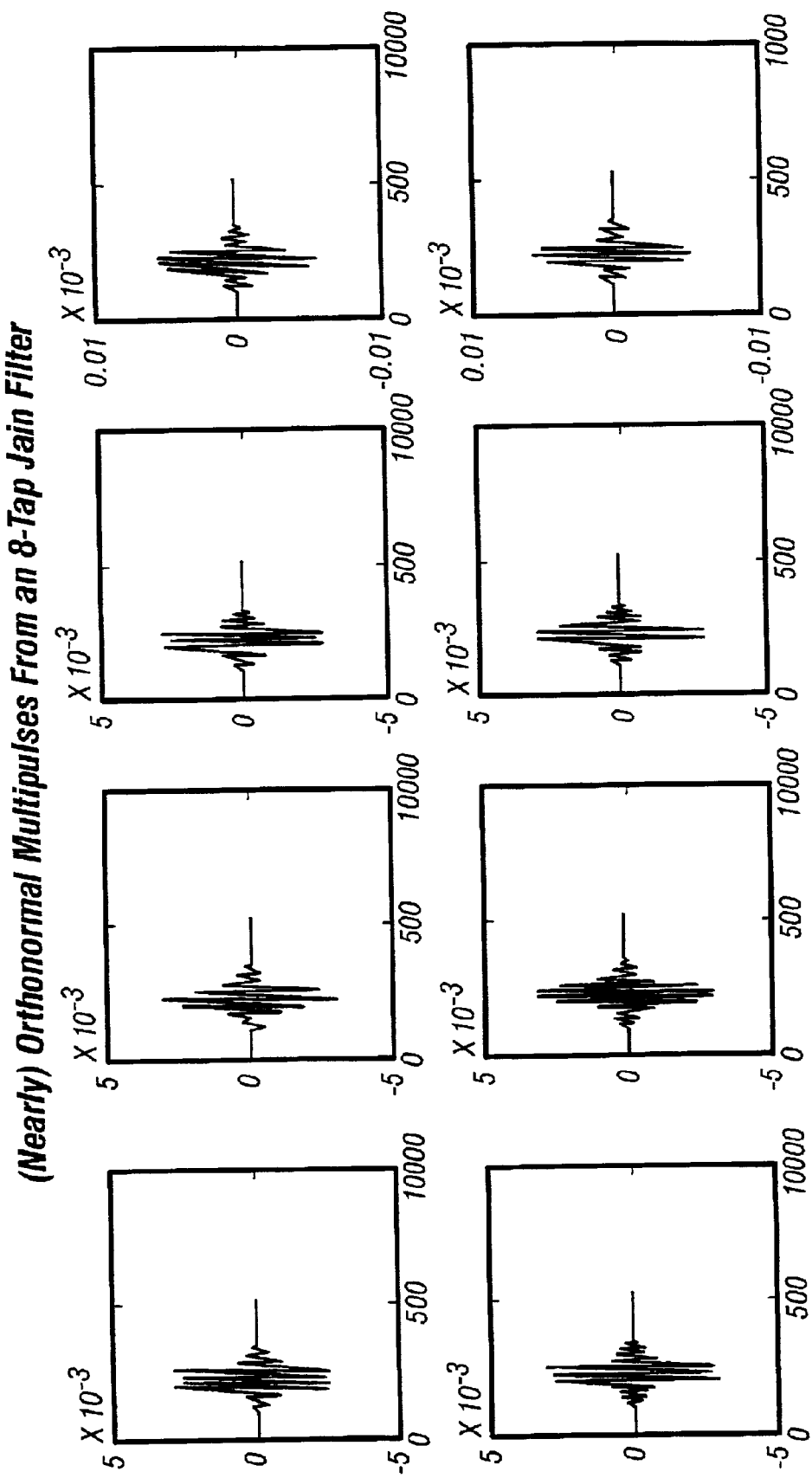
Figures 2, 4D:
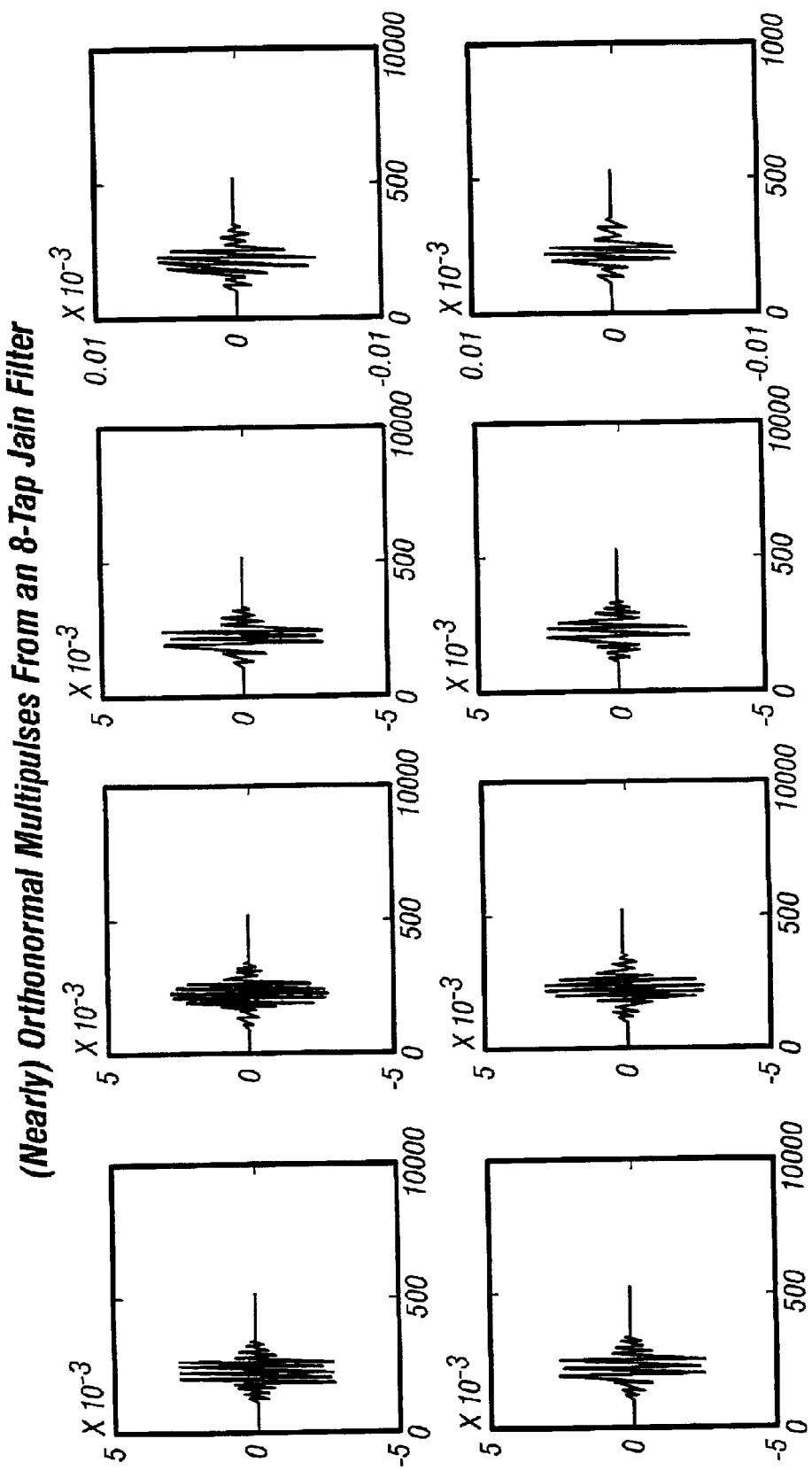
Figures 3, 4D:
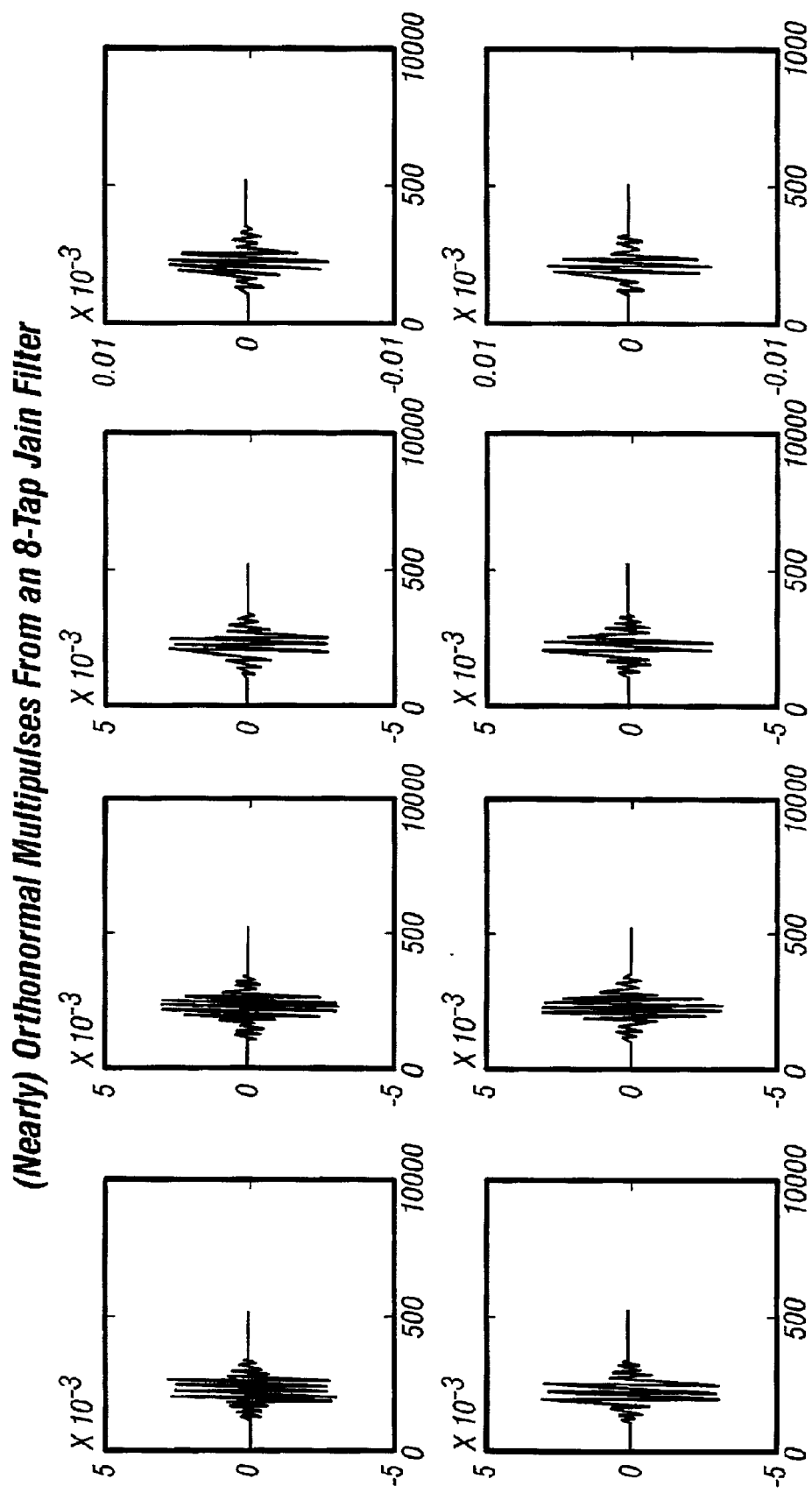
Figures 4, 4D:
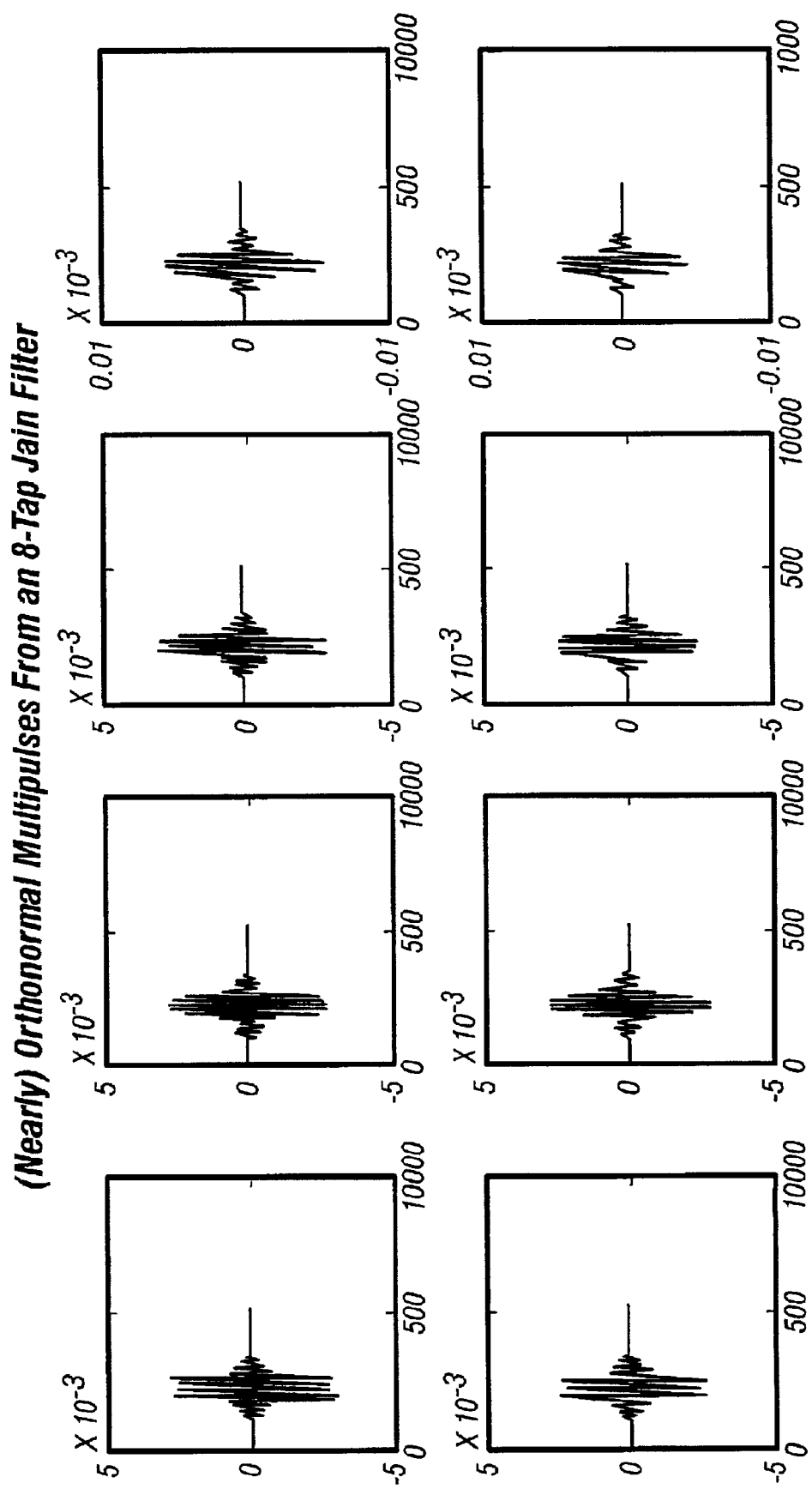

The remaining sets of OWDM pulses shown in FIGS. 4B–4C are the corresponding OWDM pulse sets for the M=16, M=32 and M=64 cases, respectively, and are derived in a similar manner as the pulses 401–415 and are not further described. In this manner, the output OWDM signal is a combined signal including each OWDM pulse for each input symbol or channel, where each OWDM pulse represents or "carries" its corresponding symbol. Because of the doubly orthogonal nature of the OWDM pulses, as described further below, the OWDM pulses do not interfere significantly with each other so that the wavelet-based receiver 105 of the transceiver system 101 is able to separate the individual symbols from the received estimated signal after the channel effects are accounted for and substantially removed.

In general, a set of OWDM pulses $\phi_m(t)$, for m=0, 1, ..., M−1 form an orthonormal set over a certain interval of time. The orthogonal multi-pulse signaling described above uses a composite pulse over each block signaling interval $T=MT_s$ formed according to the following equation 1:

$$s_0(t) = \sum_{m=0}^{M-1} a_m \varphi_m(t) \quad (1)$$

where $T_s$ it the basic symbol interval. Each basis pulse $\phi_m(t)$ serves to create a "virtual" channel over which the symbol $a_m$ is carried. The vector of symbols or supersymbol is $A=[a_0\ a_1\ \ldots\ a_{M-1}]^T$ with the supersymbol interval T. Then the baseband transmitted signal s(t) is provided in accordance with the following equation 2:

$$s(t) = \sum_{n=-\infty}^{\infty} \sum_{m=0}^{M-1} a_{n,m} \varphi_m(t-nT) = \sum_{n=-\infty}^{\infty} \underline{A}_n^T \underline{\varphi}(t-nT) \quad (2)$$

At the receiver, symbol and block timing extraction is performed and the received signal is correlated with $\phi(t-nT)$ to detect the n-th supersymbol at time nT, or nT+τ where τ denotes an optimum timing phase. Discrete-time pulses may be used since VLSI implementation is often more economical from a digital standpoint. The variable "t" is used to denote both the continuous time variable as well as the signal sample index. Also, M and T are used interchangeably to denote the block length.

The input response from the i-th input node to the output node is $\phi_i(t)$ for i=0, 1, ... M−1. The prototype filters H and G are based on Daubechies type filters, Jain type filters or some other type of appropriate filter. The family of OWDM pulses $\{\phi_i(t)\}$ are doubly orthonormal. In particular, the double orthonormality is expressed by the following equations 4 and 5:

$<\phi_i(t), \phi_k(t)> = \delta_{ik}$, for i,k=0, 1, ..., M−1 (4)

$<\phi_i(t), \phi_j(t-nT)> = \delta_n$, for all n (5)

Figures 4, 4D, 5:
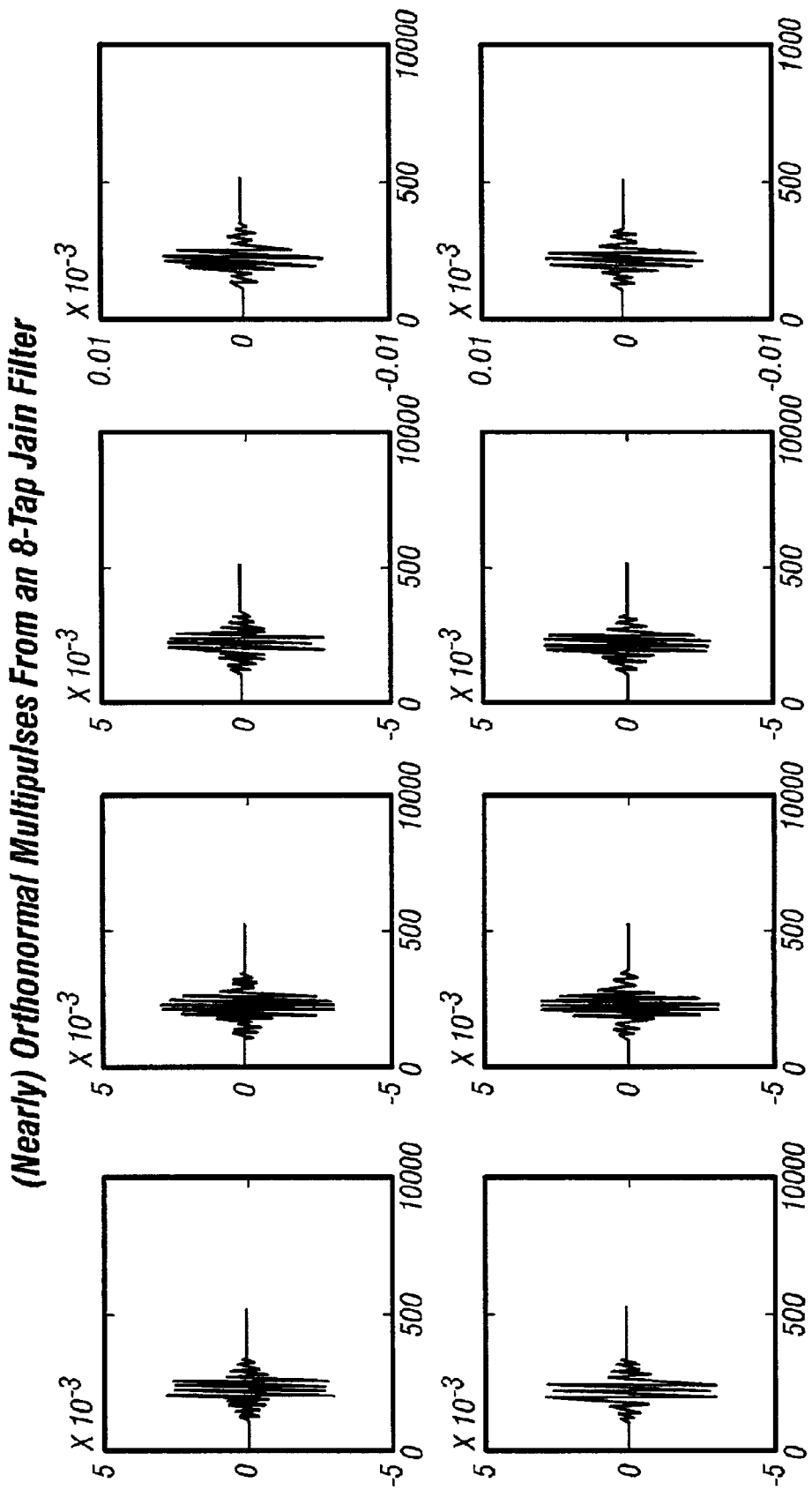
FIG. 5 is a figurative block diagram illustrating an exemplary model for a multiple path version of the channel of FIG. 1 for wireless communications.

FIG. 5 is a figurative block diagram illustrating an exemplary model 501 for a multipath version of the channel 107 for wireless communications. The model 501 is a tapped delay line with time varying coefficients in which the number of taps is equal to the number of paths. A uniform tapped delay line may be used provided the unit delay is chosen to be less than or equal to ½F, where F is the baseband signal bandwidth. The model 501 includes a first model A illustrating the Rayleigh envelope and a second model B illustrating the Log-Normal envelope fading channel. These models are well known and are not further described.

Figures 4, 4D, 5, 6:
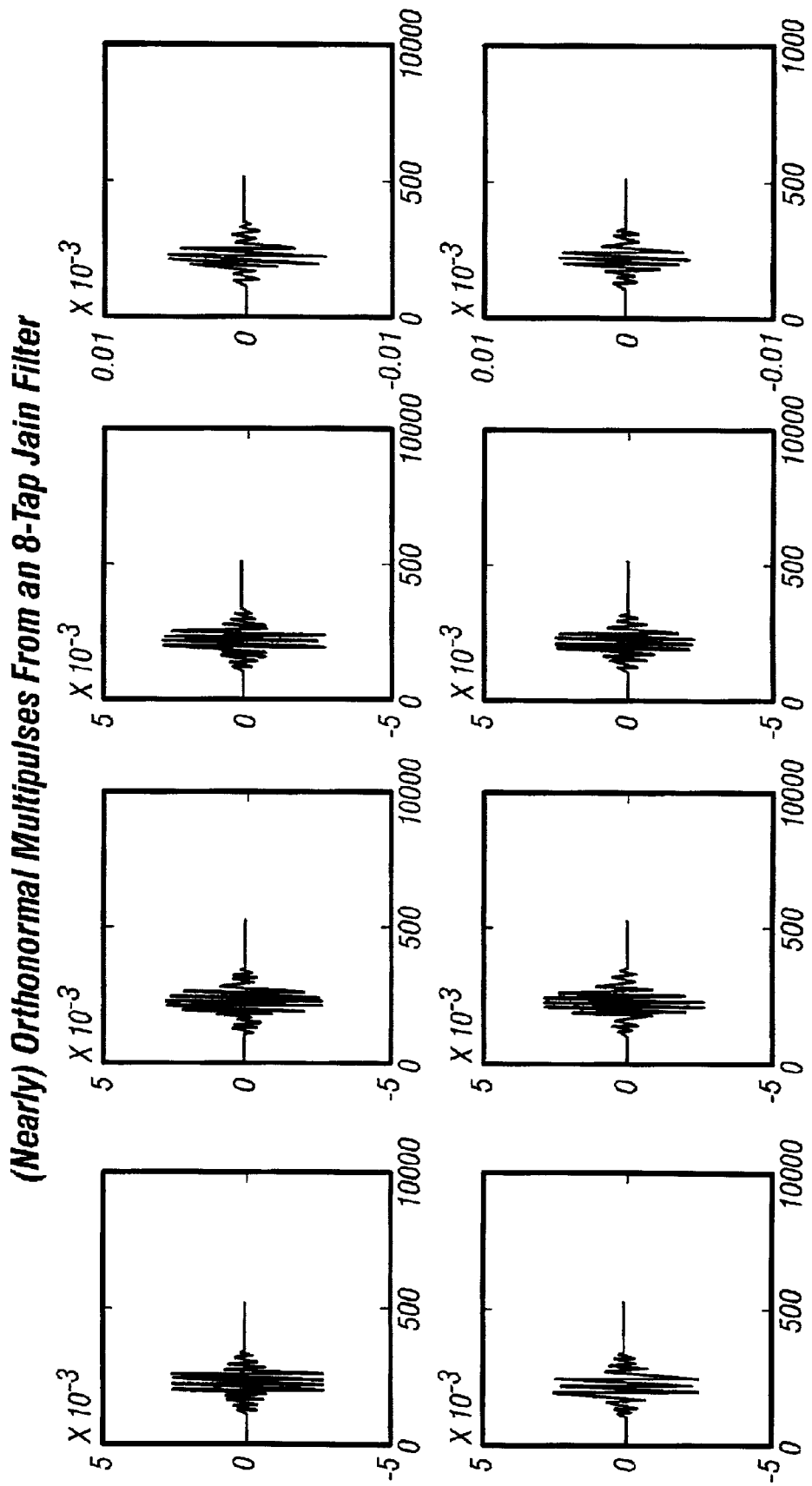
FIG. 6 is a more detailed block diagram of an exemplary embodiment of the equalizer of FIG. 1.

FIG. 6 is a more detailed block diagram of a substantive portion of the receiver 105 including the equalizer 115, the analysis section 117, the detect and DFB error block 119 and the adaptation block 121 and excluding the P/S 123 for the general case of M inputs. The receiver configuration shown uses a decision directed equalization method with an update equation $w_{k+1}=w_k+\mu P H e_k$. The modified OWDM pulse p(n) is applied to a series of N symbol or unit delays 603a, 603b, ... 603c resulting in a series of signals $p_n, p_{n-1}, p_{n-2}, \ldots p_{n-(N-1)}$ applied to respective inputs of a series of serial to parallel (S/P) converters 605a, 605b, ... 605c, 605d. Each S/P converter 605 collects L samples and asserts respective vector outputs to respective inputs of a series of scalar product blocks 607a, 607b, ... 607c, 607d. The series of scalar signals $p_n, p_{n-1}, p_{n-2}, \ldots p_{n-(N-1)}$ (or the leading component of the respective P vector signals) is applied to a series of multipliers 609a, 609b, ... 609c, 609d. The outputs of the multipliers 609 are provided to respective inputs of an adder 611, which asserts the output of the equalizer 115, shown as $r_n$, where the subscript "n" denotes the time index at the input of the analysis section 117.

The analysis section 117 receives a stream of $r_n$ signals and provides corresponding $y_k$ decision statistics representing sets of decisions statistics $Y_i$ previously described. The $y_k$ decision statistics are provided to the input of a detector block 613 and to the inverting input of an adder (add/subtract) unit 615. The detector 613 asserts estimated supersymbols $A'_k$, which are provided to the non-inverting input of the adder 615. The adder 615 operates to subtract respective decision statistics $y_k$ from corresponding estimated symbols of the supersymbol $A'_k$ and outputs corresponding error signals $e_k$. The error signals $e_k$ are provided to an H block 617, which computes the product $He_k$, where H is the analysis filterbank response matrix of the analysis section 117. The product $He_k$ is then multiplied by a rate control parameter "μ" by a multiplier 619 to generate the product $\mu He_k$. The product $\mu He_k$ is applied to another input of each of the scalar product blocks 607. Each scalar product block 607 multiplies a respective p row vector of a P matrix provided by the S/P converters 605, and asserts the respective outputs to respective inputs of a set of adders 621a, 621b, ... 621c, 621d. Each of the adders 621 adds a corresponding output of the scalar-product block 607 with a corresponding weight factor $w_0, w_1, \ldots w_{N-1}$ from respective update units 623a, 623b, ... 623c, 623d, where each update unit 623 stores a respective sum value and provides it one block interval later to respective inputs of the multipliers 609. The respective outputs of the adders 621 assert the updated weight factors, which are provided to respective inputs of the update units 623. In this manner, the update units 623 store the adjusted weight factors during operation.

In general, the number of inputs or channels $M=2^S$, where "S" is the number of stages of the synthesis and analysis sections. The matrix $P=[p_{Mk} \ldots p_{Mk-(M-1)}]$ where $p_{Mk}=[p_{Mk} \ldots p_{Mk-(M-1)}]$. The error vector $e=[e_0 \ldots e_{M-1}]^T$. The LMS update equation performed by the receiver 105 shown in FIG. 6 is $w_{k+1}=w_k+\mu P H e_k$. The matrix P is N×L dimensional, the matrix H is L×M dimensional, and the vector $e_k$ is M dimensional. Note that L is the maximum of the lengths of all of the analysis filterbank responses at its M output nodes 311 to a unit pulse at its input.

Figures 4, 4D, 5, 6, 7:
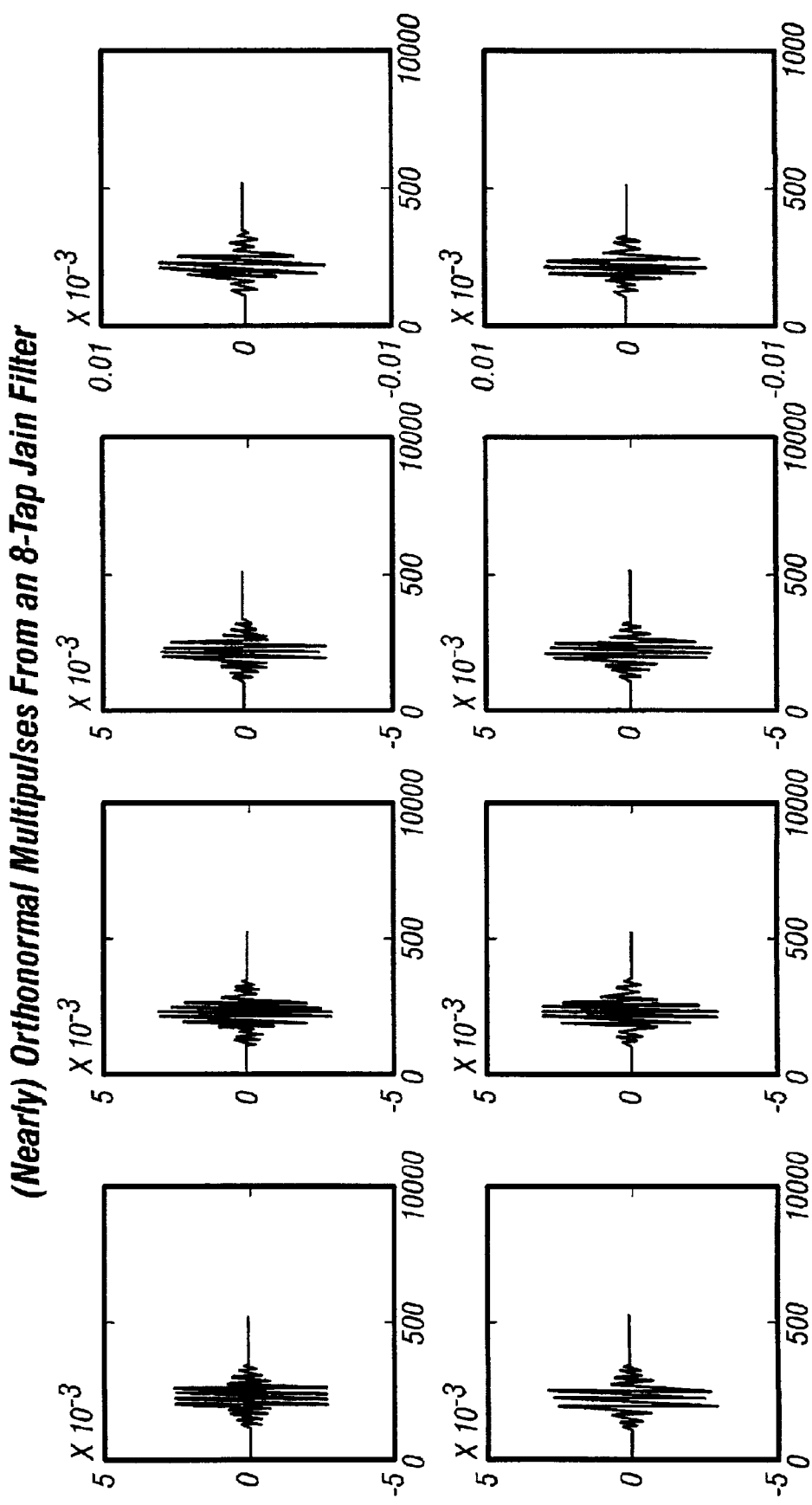
FIG. 7 is a block diagram of another wavelet based transceiver, which is substantially similar to the wavelet based transceiver of FIG. 1 except including a clipper block.

FIG. 7 is a block diagram of another wavelet based transceiver 701, which is substantially similar to the wavelet based transceiver 101 except that the transmitter includes a clipper block 703. The OWDM pulses described herein include several beneficial characteristics including low spectral sidelobes, a relatively long time support and a relatively negligible correlation between the pulses, thereby resulting in double-orthogonal pulses. These combined factors lead to reduced inter-channel interference as compared to Orthogonal Frequency Division Multiplexing (OFDM) signals. The clipping of the OWDM signal described herein provide a way of overcoming the well known crest factor problem, namely, a simple clipping at the transmitter as shown by the clipper block 703. It is desired to use the clipper block 703 because it reduces crest factor. Reducing the crest factor is desirable to provide more efficient use of the communication media by effectively clipping by a small or moderate amount.

Figures 4, 4D, 5, 6, 7, 8:
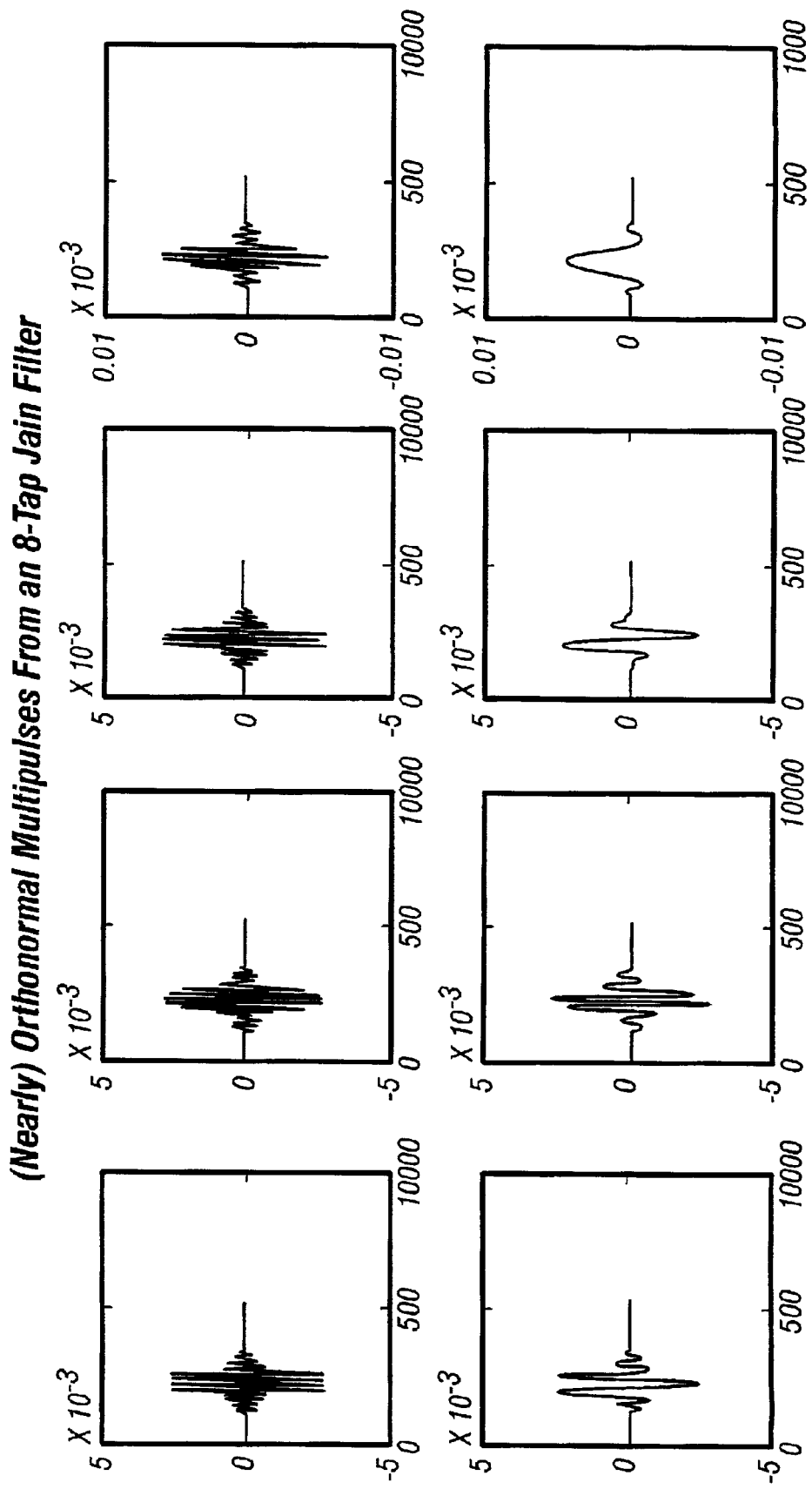
FIG. 8 is a graphic diagram illustrating the performance of an OWDM system employing clipping at the transmitter for crest factor reduction in comparison to unclipped QPSK.
Figure 4E:
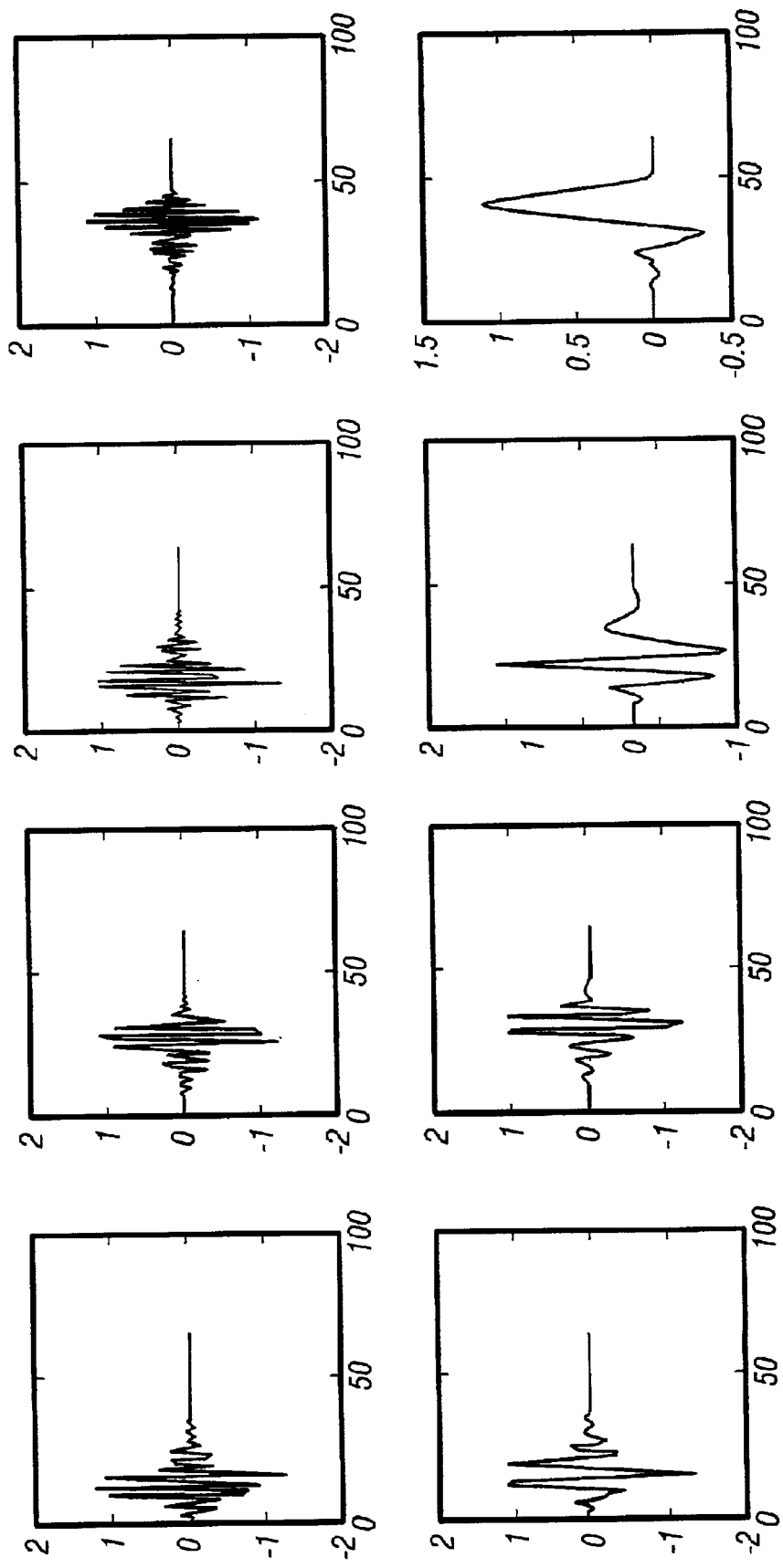
FIG. 4E is a multiple graphic diagram of respective OWDM pulses for an 8-pulse case using Daubechies filters resulting in orthonormal multipulses.
Figure 5:
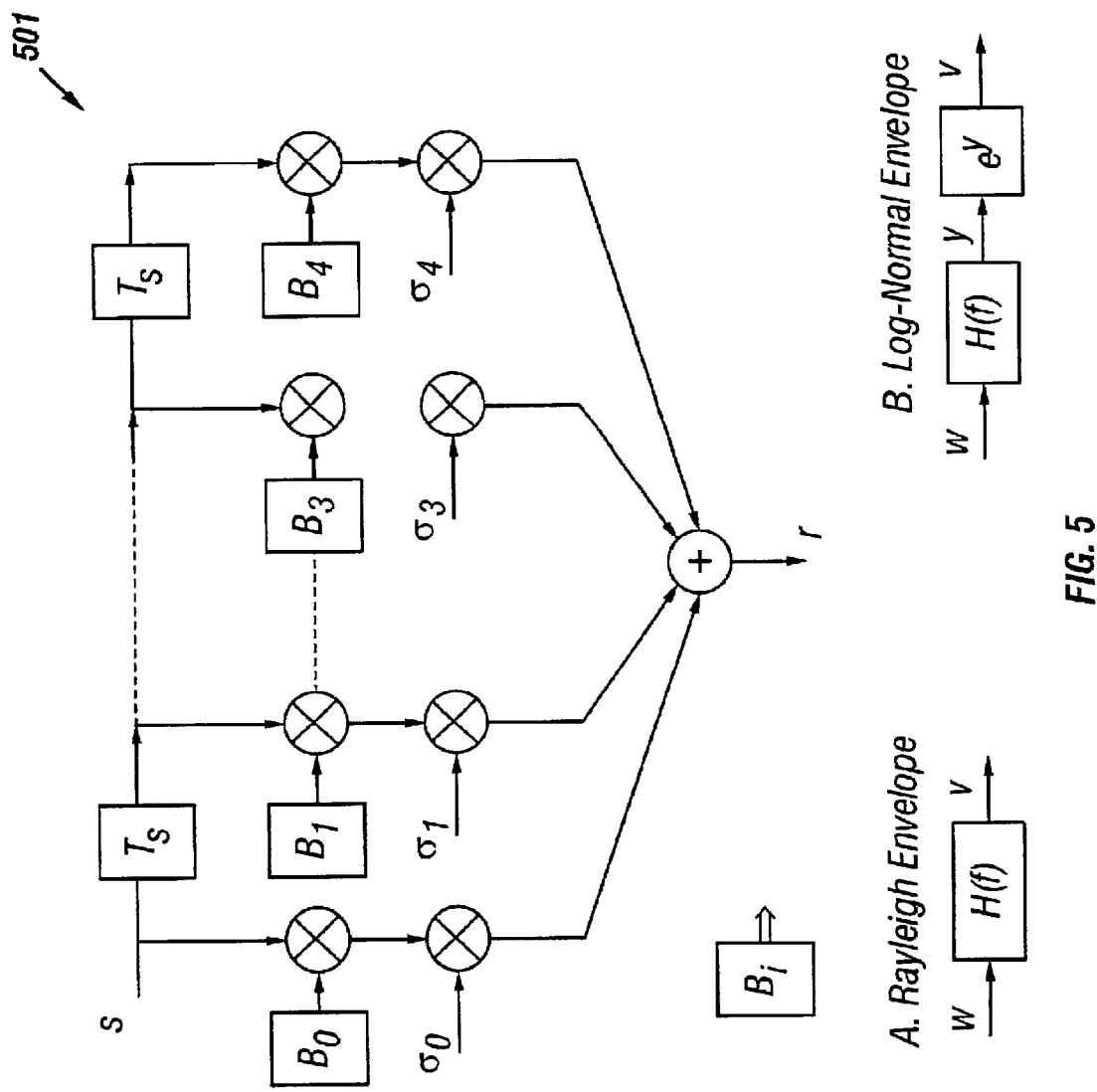
Figure 6:
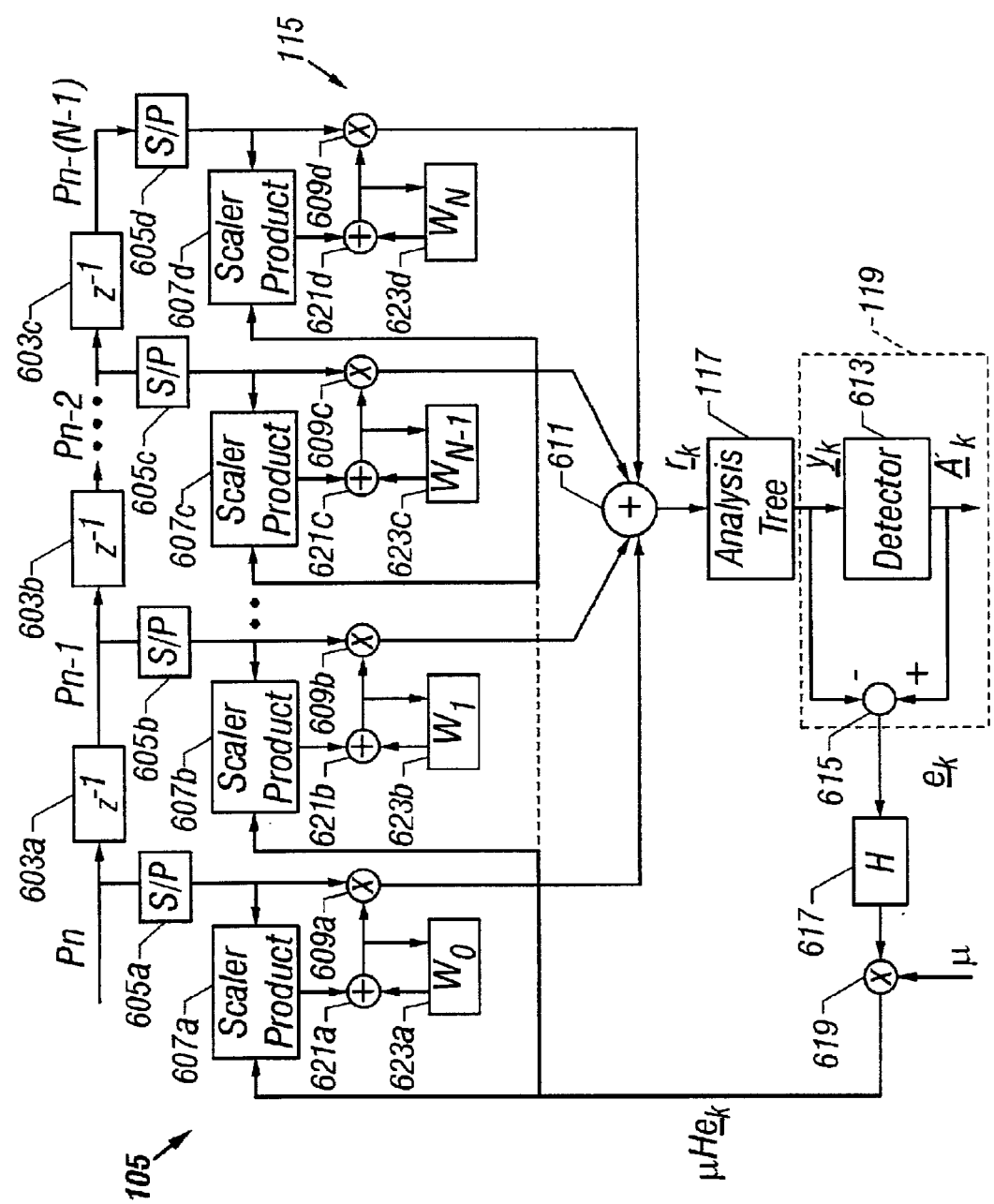
Figure 7:
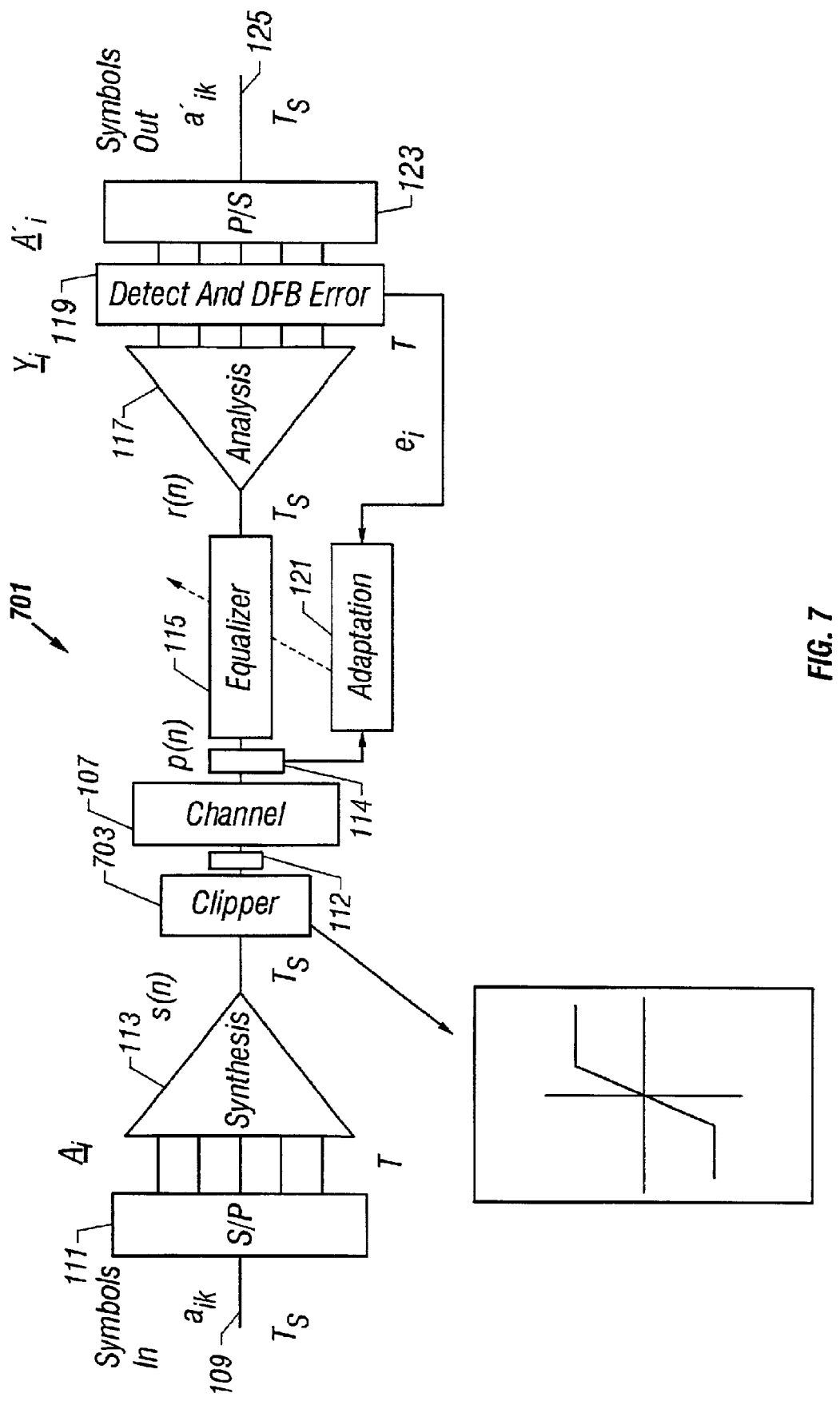
Figure 8:
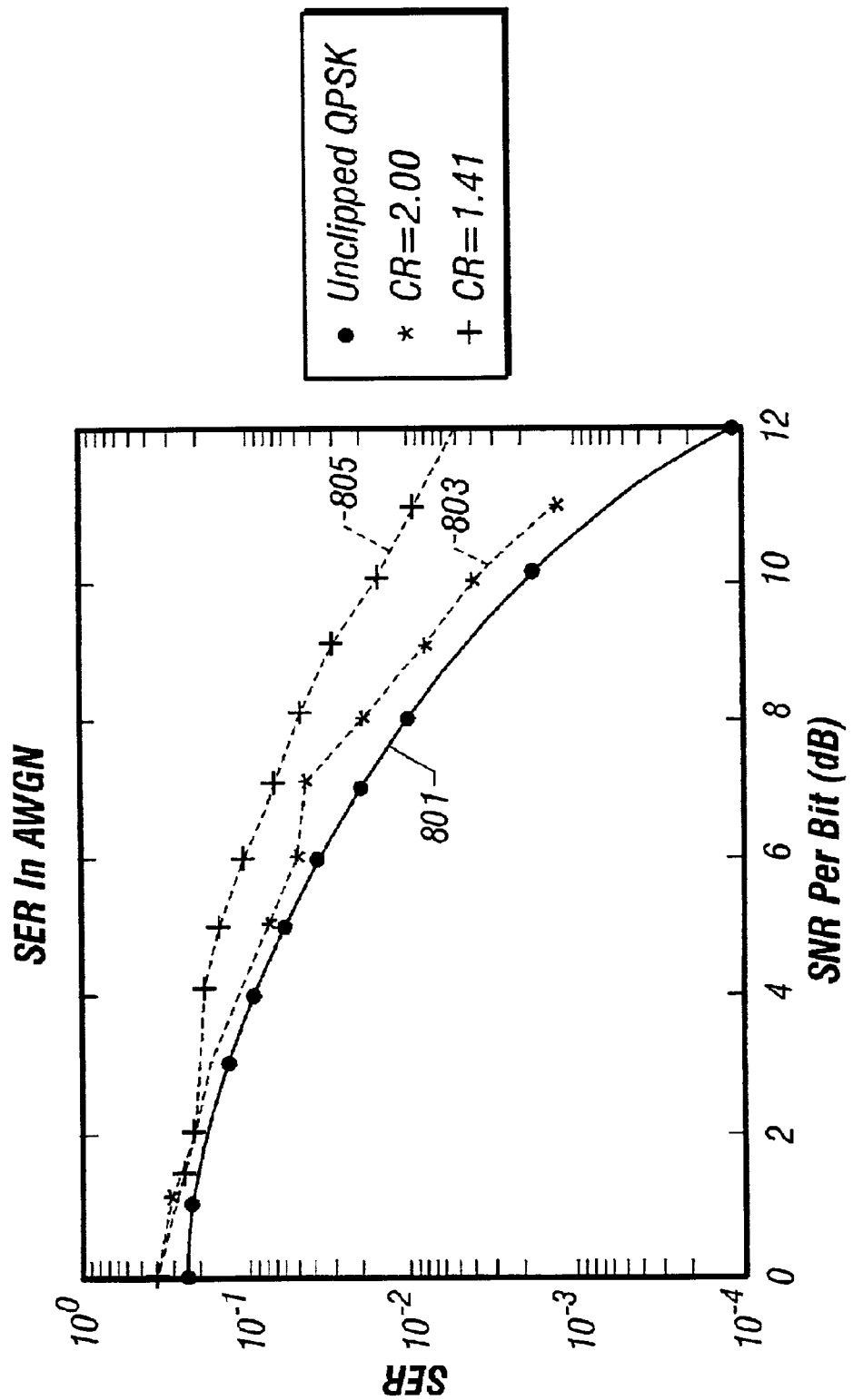

FIG. 8 is a graphic diagram illustrating the performance of an OWDM system employing clipping at the transmitter for crest factor reduction in comparison to unclipped QPSK. Although such clipping at the transmitter has a devastating effect on OFDM signals, a communications system employing OWDM pulses as described herein is tolerant of such clipping as illustrated in FIG. 8. A clipping ratio (CR) is defined as the clipping level divided by the root mean square (RMS) value. A first curve 801 illustrates unclipped QPSK. A second curve 803 illustrates a clipping ratio of 2.0 for an OWDM system illustrating that a moderate amount of clipping results in an acceptable level of performance. In this case, the maximum allowed amplitude is twice that of the RMS value of the signal. Such clipping provides a better utilization of the channel. A third curve 803 represents a high clip rate with a clipping ratio of 1.41, so that the maximum allowed amplitude is less than 50% greater than the RMS value. A certain level of performance is still achieved even given the very low clipping ratio, whereas the performance of an OFDM system would be severely depreciated. The system employing a moderate clipping ratio of 2.0 as illustrated by the curve 803 exhibits only a minor performance reduction as compared to an unclipped QPSK system.

Figure 9:
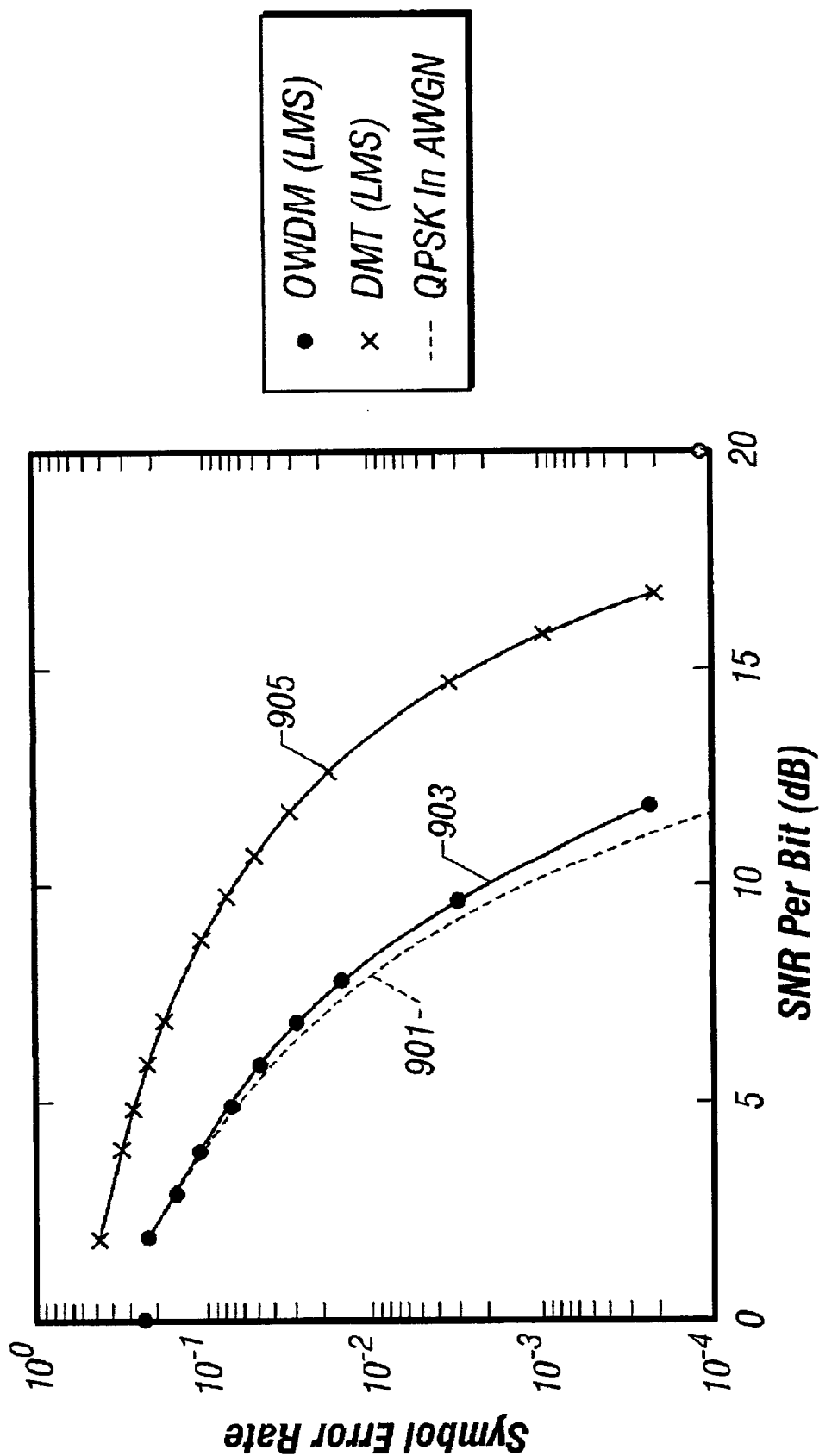
FIG. 9 is a graph diagram of simulation results illustrating a comparison of OWDM and OFDM systems in a multipath channel using 64 subchannels in which the channel characteristics were assumed to be unknown.

FIG. 9 is a graph diagram of simulation results illustrating a comparison of OWDM and OFDM systems in a multipath channel using 64 subchannels in which the channel characteristics were assumed to be unknown. In particular, the signal to noise ratio (SNR) per bit in decibels (dB) is plotted along the X axis versus the symbol error rate (SER) along the Y axis. A first curve 901 is a plot of QPSK in Additive White Gaussian Noise (AWGN), without the channel effects, and represents a lower bound theoretical result. A second curve 903 is a plot of the performance of a system employing the OWDM method and a third plot 905 represents the performance of a system employing the OFDM method, both with adaptive equalization. It is clear that the OWDM method is vastly superior as compared to OFDM. The curves illustrate that the SNR required at the receiver to achieve a SER of $10^{-4}$ is approximately 12 dB for the QPSK signaling method, approximately 13 dB for the OWDM signaling method and approximately 18 dB for the OFDM signaling method.

To further enhance system performance, channel coding may be employed. The use of a four state Trellis code results in a 3 dB improvement (without incurring any bandwidth penalty) so that a SER of $10^{-4}$ can be achieved at an energy per bit (Eb) over one-sided Noise spectral density (No) ratio (Eb/No) of only 9 dB in a 64 subchannel configuration. It is noted that the OWDM system according to an embodiment of the present invention surmounts a practical problem present in many systems referred to as drift. By inhibiting the data on the zeroeth channel or lowest frequency wavelet channel, such as $a_{i0}$ of the transmitter 103, the signal can be AC-coupled thereby eliminating the ill effects of drift.

Figure 10A:
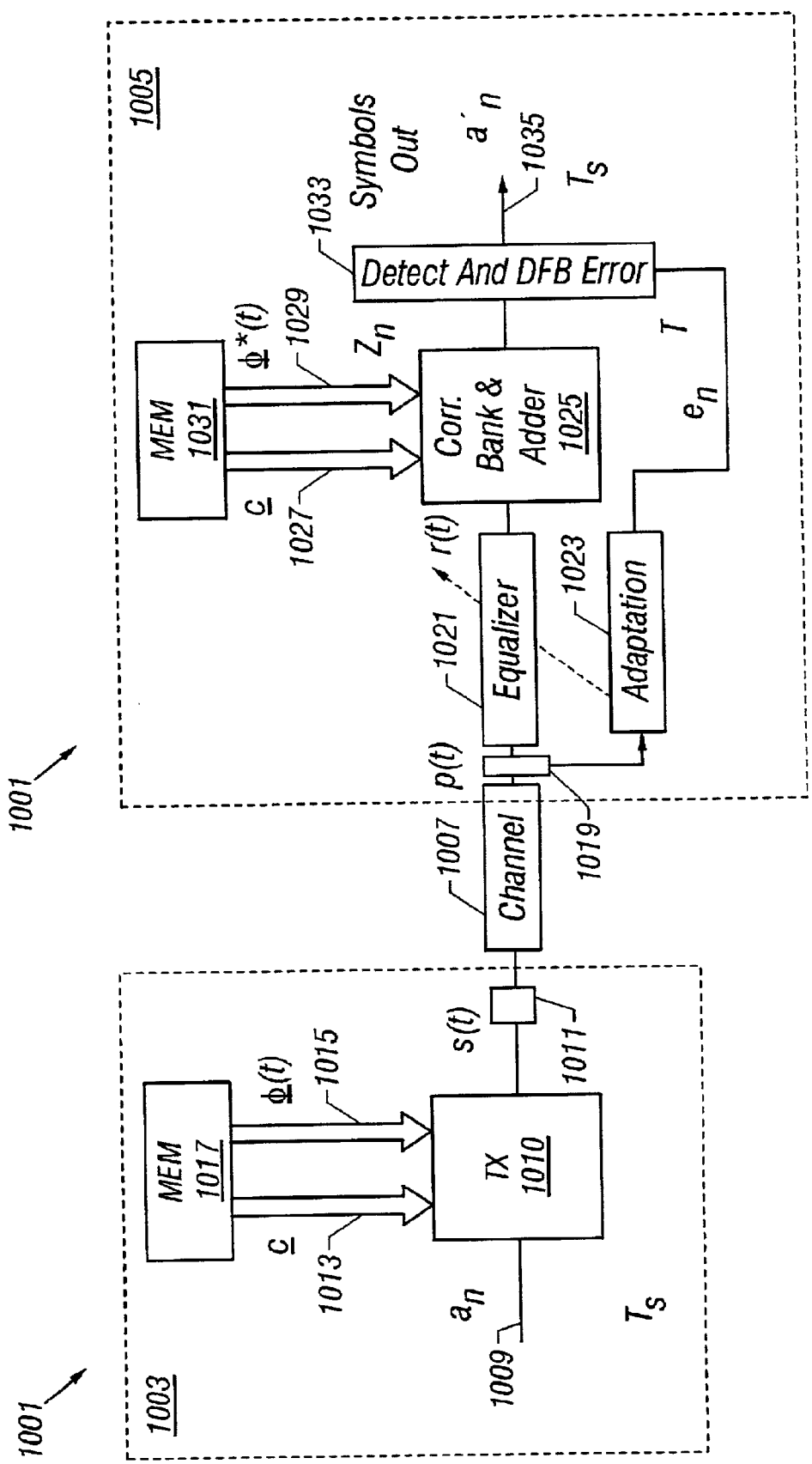
FIG. 10A is a conceptual block diagram of an OWDM-spread spectrum (OWSS) transceiver system implemented according to an embodiment of the present invention.

FIG. 10A is a conceptual block diagram of an OWDM-Spread Spectrum (OWSS) transceiver system 1001 implemented according to an embodiment of the present invention. The OWSS transceiver system 1001 includes a transmitter 1003 that communicates with an OWSS receiver 1005 via a channel 1007. As before, the transceiver system 1001 illustrates both transmitter and receiver functions for a transmitted OWSS signal, although a typical transceiver would include both transmitter and receiver functions coupled via a common channel interface. The OWSS transceiver 1001 employs OWSS pulses that are derived from the OWDM pulses previously described, except that representative OWDM pulses are spread in the wavelet domain using a suitable family of Pseudo Noise (PN) codes. A serial stream of symbols, denoted $a_n$, is provided at an input 1009 to an OWSS transmitter (TX) 1010, which provides a signal s(t) to a channel interface 1011, which asserts the s(t) signal onto the channel 1007. The channel 1007 may be any type of medium or media in a similar manner as the channel 107, and the channel interface 1011 is configured in accordance with the selected media or medium, such as an appropriate MAC and PHY device or the like.

The OWSS transmitter 1010 receives a scalar code vector, denoted c, via a set of bus signals 1013 and receives an OWDM pulse vector, denoted $\phi(t)$ via another set of bus signals 1015. The code vector c is specific to each user of the system and includes set of codes $c_m^{(k)}$. The individual code vectors of the set of codes $c_m^{(k)}$ may each be used for a corresponding user of a multiple user system, where each user code vector is denoted by the superscript "k". The OWDM pulse vector $\phi(t)$ includes a set of OWDM pulses $\phi_m(t)$ that may be generated by a wavelet filter bank, such as a wavelet filter bank configured in a similar manner as that illustrated by the synthesis section 113. The set of OWDM pulses $\phi_m(t)$ are the same for each symbol to be transmitted. Thus, the set of OWDM pulses $\phi_m(t)$ may instead be pre-generated and electronically stored, such as within a memory 1017 coupled to the transmitter 1003 via the bus signals 1015. The OWDM pulses $\phi_m(t)$ are provided to the transmitter 1003 for each symbol $a_n$ to be transmitted. In a similar manner, the set of codes $c_m^{(k)}$ may also be stored in the memory 1017, such as including a separate code vector for each user of a multiple user system. A selected set of the codes $c_m^{(k)}$ corresponding to the symbol $a_n$ or to a particular user is provided to the OWSS transmitter 1010. Select logic or the like (not shown) is provided to access the memory 1017 and to provide the selected values to the OWSS transmitter 1010.

The OWSS signal s(t) is received by a channel interface 1019 of the receiver 1005 as a channel-modified OWSS signal p(t), which is provided to respective inputs of an equalizer 1021 and an adaptation block 1023. As described further below, the equalizer 1021 may be a forward equalizer (FE) with decision directed adaptation. In addition, a decision feedback equalizer (DFE) may be used. The equalizer 1021 operates in a similar manner as the equalizer 115 previously described and asserts an estimated OWSS signal r(t) to a correlator bank and adder 1025. The correlator bank and adder 1025 receives a code vector q on a set of bus signals 1027. The code vector q is the same as, or is a modified version of, the code vector c and is specific to each user of the system and includes set of codes $q_m^{(k)}$ for each user. The correlator bank and adder 1025 also receives a set of OWDM pulses $\phi_m^*(t)$ at another input 1029. The set of OWDM pulses $\phi_m^*(t)$ are the complex conjugates of the set of OWDM pulses $\phi_m(t)$. In this manner, the set of OWDM pulses $\phi_m(t)$ are of a first family of doubly orthonormal pulses and the set of OWDM pulses $\phi_m^*(t)$ are of a second family of doubly orthonormal pulses, in which the first and second families of OWDM pulses may be related to each other. The set of codes $q_m^{(k)}$ and the set of OWDM pulses $\phi_m^*(t)$ may be stored in a memory 1031, similar to the memory 1017, where the memory 1031 is coupled to the correlator bank and adder 1025 via the bus signals 1027 and 1029.

The correlator bank and adder 1025 assert decision statistics $z_n$ that correspond to the original symbols $a_n$ provided to the OWSS transmitter 1010. The decision statistics $z_n$ are provided to a detect and DFB error block 1033, which operates in a similar manner as the detect and DFB error block 119 previously described. In particular, the detect and DFB error block 1033 makes decisions on the decision statistics $z_n$ and asserts estimated symbols $a'_n$ at an output 1035, where the estimated symbols $a'_n$ are intended to be duplicates of the signals $a_n$. The detect and DFB error block 1027 asserts corresponding error signal $e_n$ to the adaptation block 1023, which updates the equalizer 1021 in a similar manner as described above for the adaptation block 121. As described previously with respect to the wavelet based transceiver 101, the OWSS transceiver system 1001 conducts a training phase during which a known set of OWSS symbols, pre-stored at the transmitter 1003 and the receiver 1005, are transmitted through the channel 1007 to initially train the equalizer 1021. The effects of the channel 1007 are measured by the adaptation block 1023 by comparing the correlator output with the previously stored and known symbol values. The adaptation block 1023 correspondingly adjusts the equalizer 1021 based on the comparisons. During operation, the detect and DFB error block 1027 continuously updates the error signals $e_n$ provided to the adaptation block 1023, which correspondingly updates the equalizer 1021. In this manner, the equalizer 1021 is continuously updated to conduct an inverse process of the channel 1007 to convert the input signal p(t) to an estimated received signal r(t).

It is noted that the memories 1017 and 1031 may be combined into a single memory device for a single transceiver device with transmit and receive functions and a common MAC and PHY device. Also, the same code vectors may be used for the code vectors c and q if the respective codes are the same. A dual set of $\phi_m(t)$ and $\phi_m^*(t)$ pulses may be stored within the same memory device. Or a single set of $\phi_m(t)$ may be stored, and $\phi_m^*(t)$ pulses generated therefrom through conjugation, that is negation of the imaginary part of each pulse.

Figure 10B:
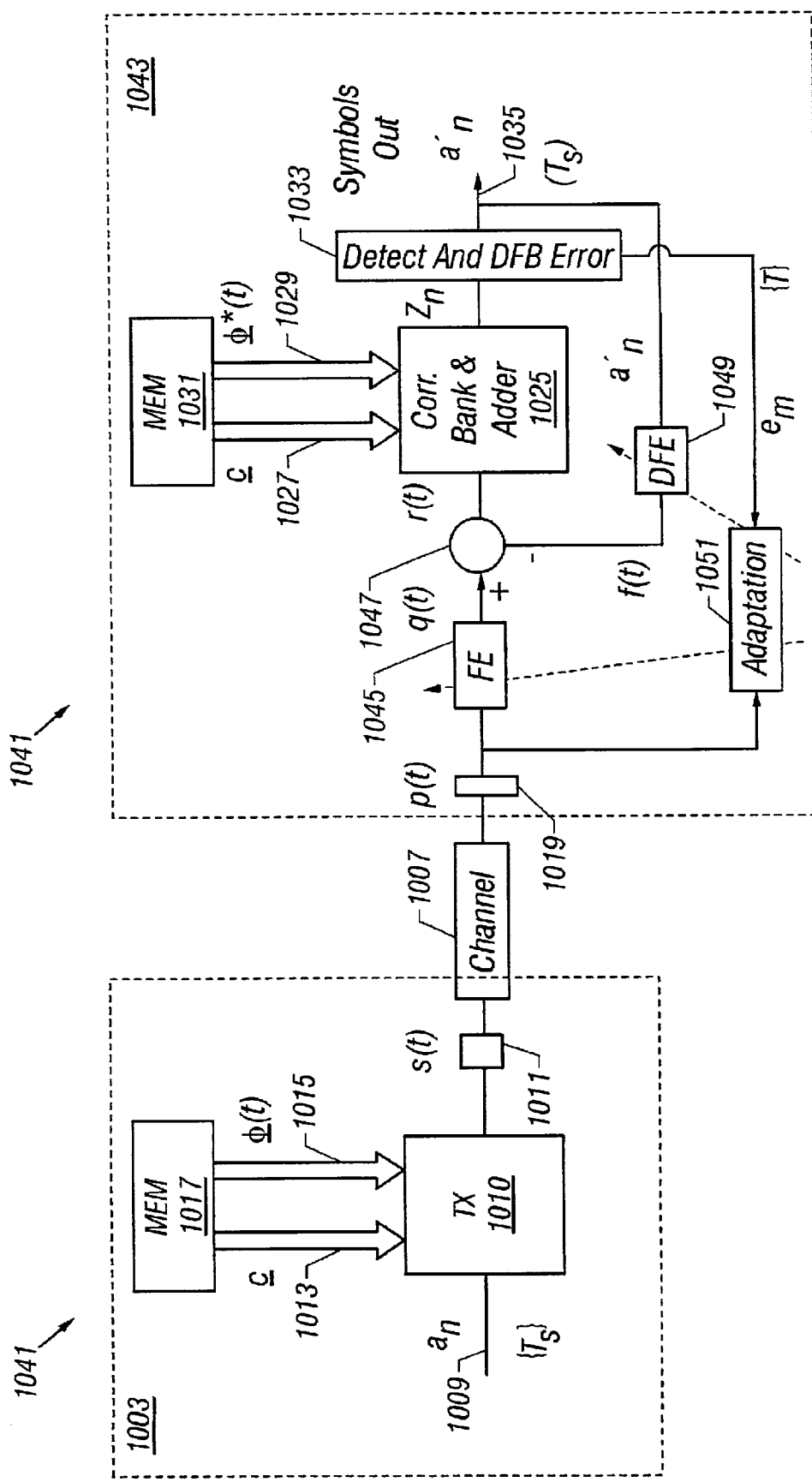
FIG. 10B is a conceptual block diagram of an OWSS transceiver system implemented according to another embodiment of the present invention including a forward equalizer (FE) and a decision feedback equalizer (DFE).

FIG. 10B is a conceptual block diagram of an OWSS transceiver system 1041 implemented according to another embodiment of the present invention including a forward equalizer (FE) 1045 and a decision feedback equalizer (DFE) 1049. The OWSS transceiver system 1041 is similar to the OWSS transceiver system 1001 in which similar devices assume identical reference numerals. The transmitter 1003 is substantially the same. The OWSS receiver 1005 is replaced by an OWSS receiver 1043, which includes the channel interface 1019, the detect and DFB error block 1033, the memory 1031 and the buses 1027, 1029 in a similar manner as the receiver 1005. The equalizer 1021 and adaptation block 1023 are replaced by the FE 1045, an adder (add/subtract) 1047, the DFE 1049 and an adaptation block 1051.

In the configuration shown, the p(t) signal is provided to the FE 1045, which provides an equalized signal q(t) to the non-inverting input of the adder 1047. The adder 1047 subtracts a decision feedback signal f(t), received at an inverting input of the adder 1047, from the q(t) signal and asserts an estimated signal r(t) at its output to the input of the correlator 1025, which asserts decision statistics $z_n$ to the input of the detect and DFB error block 1033. The detect and DFB error block 1033 asserts the estimated symbols $a'_n$ at the output 1035 and asserts an error signal $e_n$ at its feedback output to the adaptation block 1051. The estimated symbols $a'_n$ are provided to an input of the DFE 1049, which generates the decision feedback signal f(t) provided to the adder 1047. The adaptation block 1051 is similar to those previously described except that it adjusts both the FE 1045 and the DFE 1049 during the training and operation phases. An OWSS transceiver employing an FE and DFE allows for modulation schemes with larger constellations to achieve higher bit rates.

Figure 11:
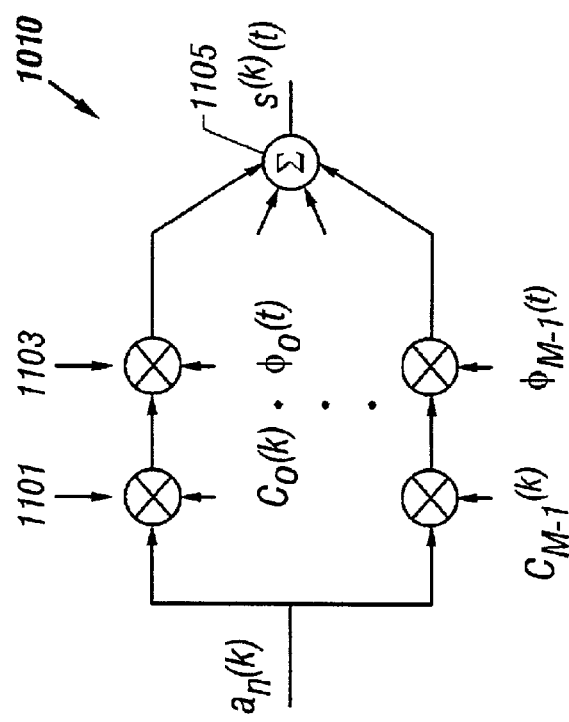
FIG. 11 is a more detailed block diagram of the OWSS transmitter of FIGS. 10A or 10B according to an embodiment of the present invention.

FIG. 11 is a more detailed block diagram of the OWSS transmitter 1003 according to an embodiment of the present invention. The input signal $a_n^{(k)}$ represents a stream of symbols, which are provided to respective inputs of a set of combiners or multipliers 1101. The multipliers 1101 each receive a corresponding code value $c_m^k$ of the code vector c, or $c_0^k \ldots c_{M-1}^{(k)}$. In the embodiment shown, each scalar code $c_m$ is a +1 or −1 and operates to either copy each symbol $a_n$ to its output (+1) or to assert an inverted version (−1) of each symbol. The respective outputs of the set of multipliers 1101 are provided to respective inputs of another set of combiners or multipliers 1103. Another input of each of the multipliers 1103 receives a corresponding pulse $\phi_m(t)$, from the set $\phi_0(t) \ldots \phi_{M-1}(t)$. The respective outputs of the multipliers 1103 are provided to corresponding inputs of an adder 1105, which develops a corresponding transmit signal $s^k(t)$ at its output.

Figure 12:
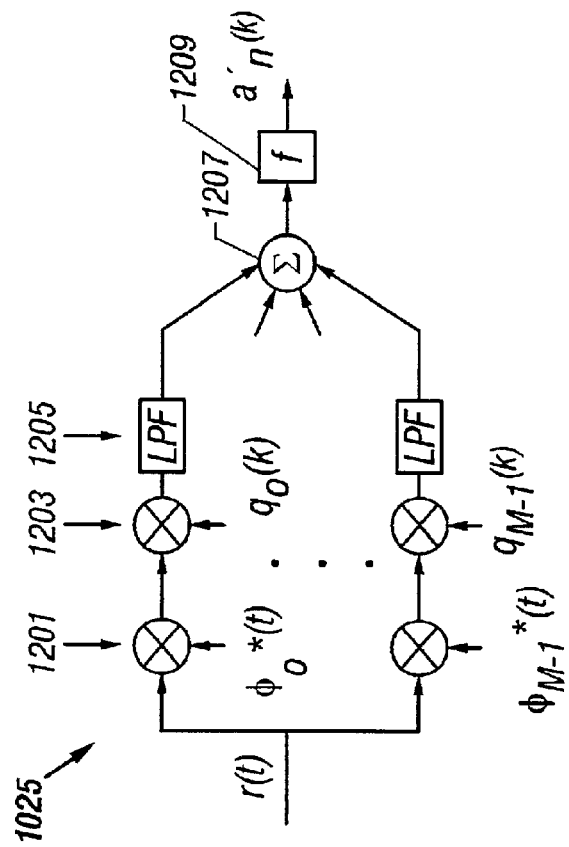
FIG. 12 is a block diagram of the correlator bank and adder of FIGS. 10A or 10B implemented according to an embodiment of the present invention.

FIG. 12 is a block diagram of the correlator bank and adder 1025 implemented according to an embodiment of the present invention. The estimated signal r(t) is provided to one input of each of a set of combiners or multipliers 1201. Another input of each of the multipliers 1201 receives a respective OWDM pulse of the set of OWDM pulses $\phi_m^*(t)$. The set of OWDM pulses $\phi_m^*(t)$ may be generated by a wavelet filter bank as previously described. The respective outputs of each of the multipliers 1201 are provided to respective inputs of another set of combiners or multipliers 1203. A second input of each of the set of multipliers 1203 receives a corresponding code value $q_m^{(k)}$ of the code vector q, where the code vector q is a fixed code that corresponds to the kth user. In one embodiment, each code vector q is the same as the corresponding code vector c. In an alternative embodiment, the code vectors q are modified version of the code vectors c to improve performance if necessary or as desired. The respective outputs of the multipliers 1203 are provided to respective inputs of a set of low pass filters (LPFs) 1205, and the outputs of the LPFs 1205 are provided to respective inputs of a adder 1207. The combined output of the adder 1207 is provided to a block 1209, representing the operation of the detect and DFB error block 1033, the adaptation block 1023 and the equalizer 1021 to develop the estimated symbols $a'_n$.

In general the transmitted signal $s^{(i)}(t)$ for the i-th user is according to the following equation 5:

$$s^{(i)}(t) = \sum_n a_n^{(i)} \sum_{m=0}^{M-1} c_m^{(i)} \varphi_m(t - nT) = \sum_n a_n^{(i)} \psi^{(i)}(t - nT) \quad (5)$$

where $\Psi^{(i)}(t)$ is referred to as a broadband pulse for the i-th user. In particular, the broadband pulse $\Psi^{(i)}(t)$ is provided according to the following equation 6:

$$\psi^{(i)}(t) = \sum_{m=0}^{M-1} c_m^{(i)} \varphi_m(t) \quad (6)$$

In one embodiment, the Walsh-Hadamard codes, which are orthogonal, are used as the basis of the code vectors c or q. As a consequence, it can readily be shown that the OWSS pulses $\Psi^{(i)}(t)$ for i=0, . . . , M−1 obey double-orthogonality.

The received signal equals the sum of the signals received from all transmitters. Ignoring channel attenuation and the multipath effects for wireless mediums, the received signal at the k-th receiver is according to the following equation 7:

$$r(t) = \sum_{i=1}^{U} r^{(i)}(t) = \sum_{i=1}^{U} \sum_{n} a_n^{(i)} \psi^{(i)}(t - nT - \tau_i) \quad (7)$$

Assuming perfect timing with respect to the k-th user, the output of the k-th receiver correlator is according to the following equation 8:

$$\begin{aligned} z_n^{(k)} &= \langle r(t), \psi^{(k)}(t - nT - \tau_k) \rangle \\ &= a_n^{(k)} \langle \psi^{(k)}(t - nT - \tau_k), \psi^{(k)}(t - nT - \tau_k) \rangle + \\ &\quad \sum_{l \neq n} a_n^{(k)} \langle \psi^{(k)}(t - lT - \tau_k), \psi^{(k)}(t - nT - \tau_k) \rangle + \\ &\quad \sum_{i \neq k} \sum_{l} a_l^{(i)} \langle \psi^{(i)}(t - lT - \tau_i), \psi^{(k)}(t - nT - \tau_k) \rangle + \text{Noise} \\ &\cong a_n^{(k)} + (IS_n^{(k)} + IC_n^{(k)}) + N_n^{(k)} \end{aligned} \quad (8)$$

where $IS_n^{(k)}$ is referred to as intersymbol interference and where $IC_n^{(k)}$ is referred to as inter-channel interference. The intersymbol interference term $IS_n^{(k)}$ is zero due to the impulsive autocorrelation of the OWSS pulses. The following equation 9 is a simplified form of equation 8 that focuses on the down-link case for which all $\tau_i$ are equal so that the inter-channel interference term $IC_n^{(k)}$ is also zero:

$$Z_n^{(k)} \cong a_n^{(k)} + N_n^{(k)} \quad (9)$$

The probability of symbol error is then the same as in a single-user AWGN case.

Figure 13:
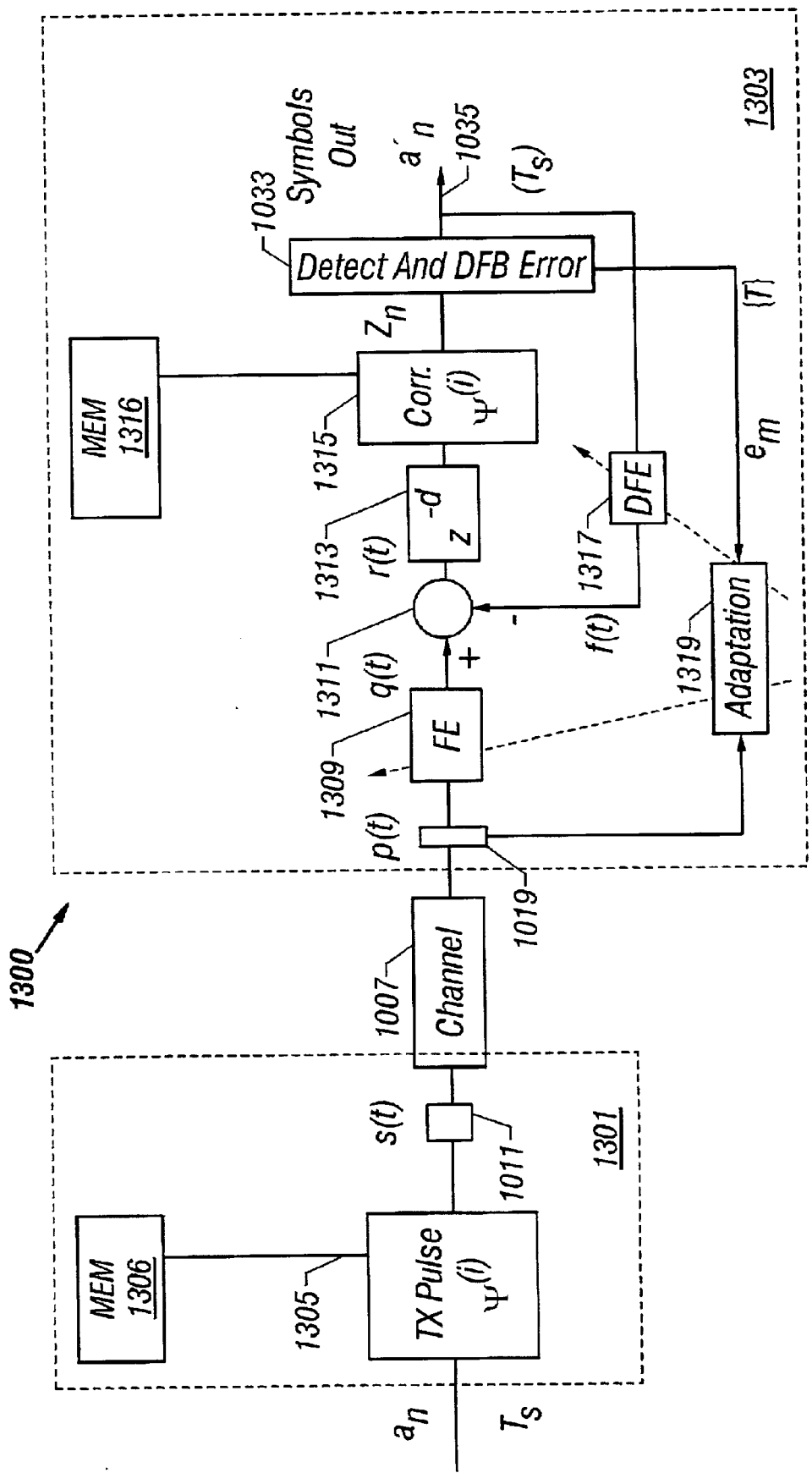
FIG. 13 is a block diagram of an OWSS transceiver system according to an another embodiment of the present invention in which the equalizer includes an FE and a DFE.

FIG. 13 is a block diagram of an OWSS transceiver system 1300 according to an another embodiment of the present invention. The OWSS transceiver system 1300 employs a transmitter 1301 and a receiver 1303 each employing the OWSS broadband pulses $\Psi^{(i)}(t)$. The OWSS transmitter 1010 is replaced by an OWSS transmitter 1305 and the correlator bank and adder 1025 is replaced by an OWSS correlator 1315. In one embodiment, the OWSS transmitter 1305 and OWSS correlator 1315 may be memory-based in which each employs a memory device 1306 and 1316, respectively, such as read-only memory (ROM) devices or the like. The memory devices 1306, 1316 may be incorporated within the OWSS transmitter 1305 and the OWSS correlator 1315, respectively. A ROM-based version of the OWSS transceiver system 1300 is possible in which the PN codes are absorbed into the broadband pulse $\Psi^{(i)}(t)$ for the i-th transmitter-receiver pair and electronically stored in a corresponding memory device. In particular, each scalar code value of a code vector is multiplied or otherwise combined with a corresponding OWDM pulse of an OWDM pulse vector; the resulting constituents are all added together to produce the broadband pulse $\Psi^{(i)}(t)$. A separate broadband pulse may correspond to each of the users of a multiple user system. The first memory 1306 stores the $\Psi^{(i)}(t)$ pulses for the transmitter 1305 and the second memory 1316 stores the $\Psi^{(i)}(t)$ pulses for the correlator 1315. The ROM configuration may use lookup tables or the like. It is noted that the OWDM pulse vector may be the same for both the transmitter 1301 and the receiver 1303, so that the same set of $\Psi^{(i)}(t)$ pulse vectors may be employed in both. Further, in a single transceiver system, a single ROM may be employed to store the corresponding $\Psi^{(i)}(t)$ pulses for both the transmitter and the receiver.

The OWSS transmitter 1305 combines each of the input symbols $a_n$ with a selected $\Psi^{(i)}(t)$ pulse vector and generates an OWSS signal s(t), that is asserted on the channel 1007 by the channel interface 1011. The channel interface 1019 receives a channel modified OWSS signal p(t) from the channel 1007. In the configuration shown, the p(t) signal is provided to an FE 1309, which provides an equalized signal q(t) to the non-inverting input of an adder (add/subtract) 1311. The adder 1311 subtracts a decision feedback signal f(t), received at an inverting input of the adder 1311, from the q(t) signal and asserts an estimated signal r(t) at its output to an optional delay device ($z^{-d}$) 1313, where the delay "d" is typically a few sample delay. The output of the delay device 1313 is provided to the input of the correlator 1315, which asserts decision statistics $z_n$ to the input of the detect and DFB error block 1033. The detect and DFB error block 1033 asserts the estimated symbols $a'_n$ at the output 1035 and asserts an error signal $e_m$ at its feedback output to an adaptation block 1319. The estimated symbols $a'_n$ are provided to an input of a DFE 1317, which generates the decision feedback signal f(t) provided to the adder 1311. The adaptation block 1319 is similar to those previously described except that it adjusts both the FE 1309 and the DFE 1317 during the training phase and during operation.

In an exemplary embodiment with a communication rate of 108 Mbps using QAM-64, the symbol rate is 18 Megasymbols per second (Msps), so that the symbol interval is $1/18,000,000$ seconds or $1/18$ microseconds (µs). The delay value "d" typically ranges between 0 and 10 samples, so that the maximum delay generated by the delay device 1313 is 10/18 µs in this example.

Figure 14:
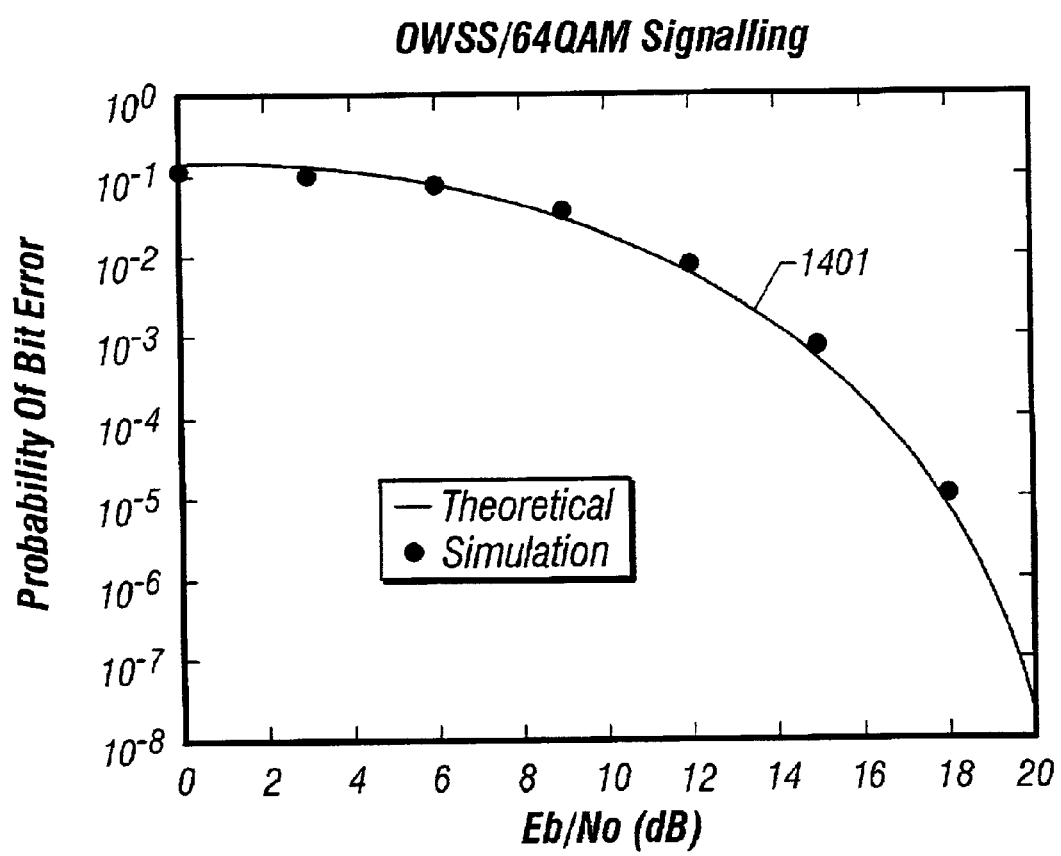
FIG. 14 is a graphic diagram illustrating the probability of bit error for an OWSS system employing QAM-64 as the selected modulation scheme and an Additive White Gaussian Noise (AWGN) channel.

FIG. 14 is a graphic diagram illustrating the probability of bit error for an OWSS system employing QAM-64 as the selected modulation scheme. The graph is a plot of Eb/No measured in decibels (dB) along the X axis and probability of bit error along the Y axis, for an Additive White Gaussian Noise (AWGN) channel. A curve 1401 illustrates the theoretical curve and the circular points indicate the results of simulation for OWSS/QAM-64 signaling. In this manner, the simulation results agree very closely with the theoretical results.

The input to the detect and DFB error block 1033 is provided above by equation 9. The bit error probability is provided now for several cases. For an OWSS/QPSK system, the constellation points are provided as $\pm b \pm j\, b$ and according to the following equation 10:

$$\sqrt{2b} = \sqrt{E_s} = \sqrt{2E_b} \quad (10)$$

The formula for bit error probability for the OWSS/QPSK case is provided by the following equation 11:

$$p_e = Q\left(\sqrt{\frac{2E_b}{N_0}}\right) \quad (11)$$

For an OWSS/QAM-16 system, the constellation points are provided as $\{i \times c\} \pm j\{k \times c\}$, where i, k $\in \{\pm 1, \pm 3\}$, and in accordance with the following equation 12:

$$c = \sqrt{E_{s,av}/10} = \sqrt{4E_{b,av}/10} \quad (12)$$

The probability of symbol error and the corresponding probability of bit error for the OWSS/QAM-16 case are given by the following equation 13:

$$p_{e,symb} = 3Q\left(\sqrt{\frac{E_{s,av}}{5N_0}}\right) \quad (13)$$

$$p_e \cong \frac{3}{4}Q\left(\sqrt{\frac{E_{s,av}}{5N_0}}\right)$$

For an OWSS/QAM-64 system, the constellation points are provided as $\{i \times c\} \pm j\{k \times c\}$, where $i, k \in \{\pm 1, \pm 3, \pm 5, \pm 7\}$, in which the variables are in accordance with the following equation 14:

$$c = \sqrt{E_{s,av}/42} = \sqrt{E_{b,av}/7} \quad (14)$$

The probability of symbol error and the corresponding probability of bit error for the OWSS/QAM-64 case is given by the following equation 15:

$$p_{e,symb} = \frac{7}{2}Q\left(\sqrt{\frac{E_{s,av}}{21N_0}}\right) \quad (15)$$

$$p_e \cong \frac{7}{12}Q\left(\sqrt{\frac{E_{s,av}}{21N_0}}\right)$$

Figure 15A:
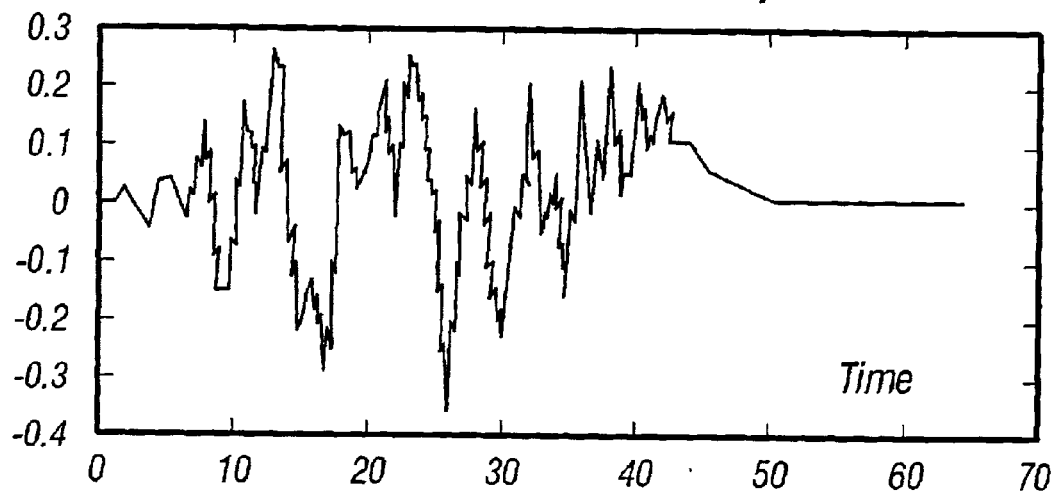
FIGS. 15A and 15B are graphic diagrams illustrating properties of a representative broadband pulse generated by the OWSS method.
Figure 15B:
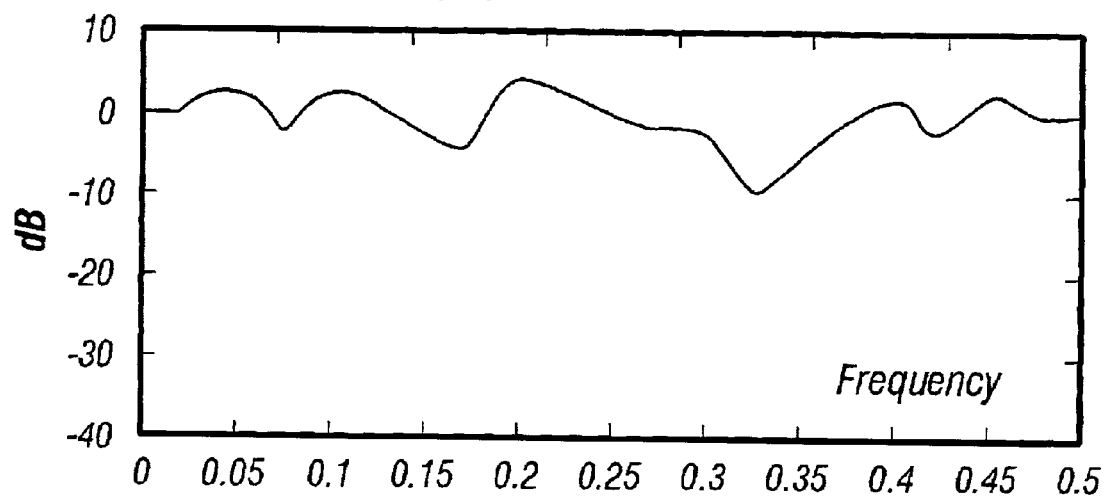

FIGS. 15A and 15B are graphic diagrams illustrating properties of a representative $\Psi^{(0)}(t)$ pulse of the set of $\Psi^{(i)}(t)$ pulses generated by the OWSS method. A three stage filter pair tree and Walsh-Hadamard codes were used for wavelet domain spreading. Only the first pulse $\Psi^{(0)}(t)$ is shown; the other seven pulses are not shown although they exhibit similar behavior in time and frequency. FIG. 15A is a plot of the $\Psi^{(0)}(t)$ pulse plotted versus time illustrating that the $\Psi^{(0)}(t)$ pulse is broad-time pulse. In particular, the $\Psi^{(0)}(t)$ pulse is wider in time as compared to typical pulses of other systems such as the raised-cosine pulses in a BPSK, QPSK, QAM-16 or QAM-64 single carrier systems. It is appreciated that the broad-time $\Psi^{(i)}(t)$ pulses are relatively robust in the presence of short bursts of interference that only affect a small portion of the pulse. In this manner, the broad-time $\Psi^{(i)}(t)$ pulses are relatively immune to impulse type noises as compared to other communication techniques including OFDM.

FIG. 15B is a plot of $\Psi^{(0)}(f)$, the Fourier transform of the $\Psi^{(0)}(t)$ pulse, in dB versus frequency indicating that the $\Psi^{(0)}(t)$ pulse is a wideband pulse that is spread across the applicable frequency spectrum. The broadband $\Psi^{(i)}(t)$ pulses are superior in that they exist over the entire applicable frequency band or a substantial portion thereof and are able to overcome frequency selective fading that can be deleterious to other communication systems including OFDM-based systems.

Figure 16:
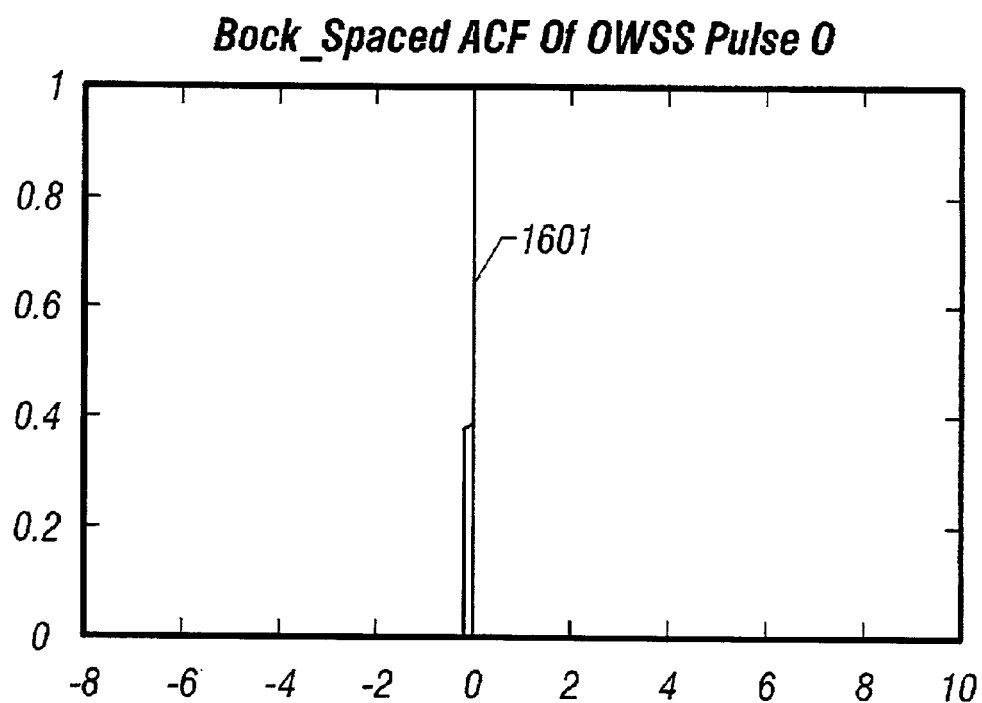
FIG. 16 is a graphic diagram illustrating the autocorrelation function of the broadband pulse of the representative broadband pulse.

FIG. 16 is a graphic diagram illustrating the autocorrelation function of the $\Psi^{(0)}(t)$ pulse. It is noted that a stream of symbols are transmitted rather than one symbol at a time thereby supporting continuously pipelined operation. As shown by the pulse 1601, the autocorrelation of the $\Psi^{(0)}(t)$ pulse at block time zero and the same pulse shifted in time is zero, which means that consecutively transmitted $\Psi^i(t)$ pulses do not see each other even though they overlap in time. In this manner, the stream of $\Psi^i(t)$ pulses do not interfere with each other even with little or no intersymbol interference (ISI) even though the pulses overlap.

Figure 17:
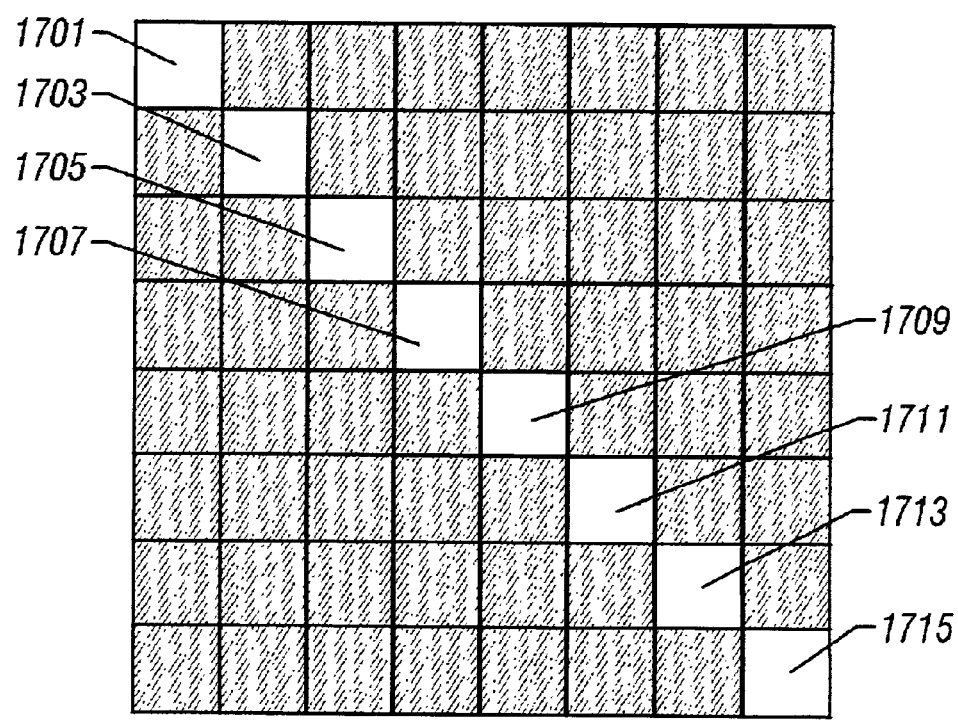
FIG. 17 is a graphic diagram of the cross-correlation map of a complete set of broadband pulses in an 8 OWSS pulse system.

FIG. 17 is a graphic diagram of the cross-correlation map of all 8 $\Psi^{(i)}(t)$ pulses in an 8 OWSS pulse system. A solid white square indicates correlation and a shaded or hatched area indicates no correlation. It is appreciated that the cross-correlation shown at 1701 of a first OWSS pulse, such as the $\Psi^{(0)}(t)$ pulse, has zero cross-correlation with each of the remaining 7 OWSS pulses having cross-correlations shown at 1703, 1705, 1707, 1709, 1711, 1713 and 1715. In this manner, each of the $\Psi^{(i)}(t)$ pulses are orthogonal with respect to each other and may coexist simultaneously without hearing or otherwise interfering with each other. The $\Psi^{(i)}(t)$ pulses are thus mutually orthogonal and can therefore support multiple user operation. In multiple user operation, each user is given a unique code of a set of orthogonal codes where the codes are mixed with the OWDM pulses as illustrated by the transmitter and receivers previously described.

The OWSS scheme described herein may be used for multiple access ranging from a high single user data rate to various shades of multiple user and correspondingly reduced data rates for each of multiple users. The overall bit rate for each user is equal to the total bit rate for the entire system divided by the number of users or a number of codes allocated to each user. For example, a 100 Megabits per second (Mbps) OWSS/QAM-64 system with a 108 Mbps gross bit rate is considered, where 8 Mbps is set aside for overhead. The symbol rate becomes $R_s = 108/6 = 18$ Msps. For M wavelet channels, the symbol rate on each channel becomes $R_{s,channel} = 18/M$ Msps with a corresponding symbol interval $T = M/18$. The bandwidth of each of the underlying wavelets $\{\phi k(t)\}_{i=0,\ldots,M-1}$ is $f = 18/M$ Megahertz (MHz). Correspondingly, the baseband bandwidth becomes $(M)(18/M)$ MHz. Finally, the transmission bandwidth is given by $B_T = (18)((M+1)/M)$. Due to the overlap between the spectra of the wavelet pulses, the bandwidth expansion takes place only for the boundary wavelets, giving rise to the factor $(M+1)/M$. For $M=64$, $T=3.555$ microseconds (µs) and $B_T = 18.28125$ MHz. For $M=8$, $T=0.44444$ µs and $B_T = 20.25$ MHz.

It is appreciated that OWDM-based systems described herein have many advantages arising from beneficial characteristics of OWDM pulses, including low spectral sidelobes, a relatively long time support and double orthogonality. Such factors lead to reduced interchannel interference and the ability to use simple clipping to deal with the well-known crest factor problem. Further, by controlling the power of the alphabet for each channel, the power spectrum may be suitably controlled, thus creating the potential for approaching the channel capacity even for frequency selective fading channels. Channel coding may be employed to enhance system performance. The data on the lowest frequency or zero channel may be inhibited and zeroed so that the signal may be AC coupled, thereby eliminating the ill effects of drift. The systems may be configured using a continuous process pipeline.

It is appreciated that OWSS-based systems described herein further builds on the beneficial characteristics of OWDM thereby adding additional advantages and benefits. Spreading OWDM pulses using appropriate PN codes results in a multi-user system in a common geographic area. OWSS pulses have both broad-time support and broadband frequency support. Wide time support is beneficial and is as much as it potentially overcomes impulsive interferers. A wide frequency support leads to inherent robustness to frequency selective fading. Bandwidth efficiency is substantially improved, such as by a factor of 2× as compared to DS-CDMA systems. The OWSS system may be targeted to deliver wireless data rates of 100 Mbps or more and exhibits high bandwidth efficiency with multiple access capability.

Further, an OWSS system in accordance with the present invention allows continuously pipelined operation.

It is noted that the OWSS scheme may be used from a high single-user data rate to various shades of multi-user and reduced data rates. In the single user case, in which only one user access the channel at a time, the sharing of a wireless channel can be achieved over time using a collision avoidance technique, such as the Carrier Sense Multiple Access/Collision Avoidance (CSMA/CA) scheme used for wireless Ethernet. Thus, a multi-user environment at a high bit rate is achievable subject to the sharing through a suitable MAC protocol. The multi-user case simply employs channelization of the pulses as described herein to transfer data for multiple user simultaneously via the channel.

Although a system and method according to the present invention has been described in connection with one or more embodiments including at least one best mode embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An orthogonal wavelet division multiplexing (OWDM) communication system, comprising:
    a synthesis section comprising a filter pair bank with a plurality of inputs and an output, each input receiving a corresponding one of a plurality of symbols of a supersymbol and the output asserting an OWDM signal that represents the supersymbol;
    wherein each symbol of the supersymbol comprises a selected one of a predetermined symbol set of a selected modulation scheme and wherein the OWDM signal comprises a linear combination of weighted OWDM pulses, each weighted OWDM pulse being representative of a corresponding symbol of the supersymbol; and
    a channel interface, coupled to the output of the synthesis section, that is configured to assert an OWDM signal onto a channel.

2. The OWDM communication system of claim 1, wherein the synthesis section receives and processes a stream of symbols to provide successive OWDM signals over successive blocks of time and wherein successive OWDM signals are superposed to produce an overall OWDM signal.

3. The OWDM communication system of claim 1, wherein the synthesis section comprises at least one filter pair stage from input to output of the synthesis section, wherein each filter pair stage includes at least one pair of filters, wherein each filter of each filter pair has an input coupled to an output of an upsampler, wherein each filter pair includes a pair of outputs coupled to respective inputs of an adder and wherein each successive stage, if any, from input to output, includes half as many filter pairs as an adjacent previous stage.

4. The OWDM communication system of claim 1, wherein the synthesis section comprises an n-stage filter pair bank in which n is a positive even integer, the n-stage filter pair bank comprising:
    an input stage, comprising:
        an input set of $2^n/2$ wavelet filter pairs, each pair receiving two symbol inputs and a pair of outputs; and
        a set of $2^n/2$ adders, each having an output and a pair of inputs coupled to a corresponding pair of outputs of the input set of $2^n/2$ wavelet filter pairs;
    at least one intermediate stage, comprising:
        a set of x wavelet filter pairs, wherein x is half the number of wavelet filter pairs of a preceding stage, each wavelet filter pair having a pair of outputs and a pair of inputs coupled to two corresponding outputs of a preceding set of adders; and
        a set of x adders, each having an output and a pair of inputs coupled to a corresponding pair of outputs of the x wavelet filter pairs of a current intermediate stage; and
    a final stage, comprising:
        a wavelet filter pair having a pair of outputs and a pair of inputs coupled to two corresponding outputs of a preceding set of adders; and
        a final adder having a pair of inputs coupled to the pair of outputs of the final stage wavelet filter pair and an output that provides the OWDM symbol representing the supersymbol.

5. The OWDM communication system of claim 4, wherein each synthesis section wavelet filter is preceded by a set of up samplers.

6. The OWDM communication system of claim 1, further comprising:
    a serial to parallel converter that converts a stream of symbols received at an input to sets of supersymbols at an output coupled to an input of the synthesis section.

7. The OWDM communication system of claim 1, further comprising:
    a clipper circuit, coupled to the output of the synthesis circuit, that limits a magnitude of the OWDM signal to a predetermined peak value.

8. The OWDM communication system of claim 1, wherein a first input of the synthesis section is zeroed to enable AC coupling.

9. The OWDM communication system of claim 1, wherein the weighted OWDM pulses and the OWDM signal are broad-time pulses.

10. The OWDM communication system of claim 1, wherein the selected modulation scheme is according to a Quadrature Phase Shift Keying scheme.

11. The OWDM communication system of claim 1, wherein the selected modulation scheme is a Quadrature Amplitude Modulation scheme.

12. The OWDM communication system of claim 1, further comprising:
    the channel interface being further configured to receive a channel-modified OWDM signal transmitted via the channel;
    an adaptive equalizer, coupled to the channel interface, that uses OWDM pulses and an error signal to perform an inverse process of the channel to convert the channel-modified OWDM signal into an estimated OWDM signal;
    an analysis section comprising a filter pair bank with an input coupled to the output of the adaptive equalizer for receiving the estimated OWDM signal and an output for asserting a corresponding plurality of decision statistics; and
    a detection circuit, having an input coupled to the output of the analysis section, that interprets each of the plurality of decision statistics based on the predetermined symbol set, that asserts a corresponding plurality of estimated symbols at an output, that measures an error of the plurality of decision statistics and that asserts the error signal to the adaptive equalizer.

13. The OWDM communication system of claim 12, wherein the synthesis and analysis sections each comprises a multistage tree-structured quadrature mirror filter bank.

14. The OWDM communication system of claim 12, wherein the synthesis and analysis sections each comprise a tree structure of low pass filter (LPF) and high pass filter (HPF) pairs.

15. The OWDM communication system of claim 14, wherein the LPF and HPF pairs are Jain filters.

16. The OWDM communication system of claim 15, wherein the LPF and HPF pairs of the analysis section are the same as the LPF and sign-negated HPF pairs of the synthesis section.

17. The OWDM communication system of claim 14, wherein the LPF and HPF pairs are Daubechies filters.

18. The OWDM communication system of claim 17, wherein the LPF of each filter pair of the analysis section is the order-reversed LPF of the synthesis section, and the HPF of each filter pair of the analysis section is the order-reversed and alternately sign-negated HPF of the synthesis section.

19. The OWDM communication system of claim 14, wherein the LPF and HPF pairs are based on a single prototype filter.

20. The OWDM communication system of claim 12, wherein the analysis section comprises at least one filter pair stage from input to output of the analysis section, wherein each filter pair stage includes at least one pair of filters, wherein each filter of each filter pair has an output coupled to an input of an upsampler and wherein each successive stage, if any, from input to output, includes twice as many filter pairs as an adjacent previous stage.

21. The OWDM communication system of claim 12, wherein the analysis section comprises an n-stage filter bank in which n is a positive even integer, the n-stage filter bank comprising:
an input stage including a wavelet filter pair having an input receiving the estimated OWDM pulse and a pair of outputs;
an output stage including a set of $2^n/2$ wavelet filter pairs, each wavelet filter pair of the output stage having an input coupled to a corresponding one of a pair of outputs of a corresponding wavelet filter pair of a previous stage and a pair of outputs asserting a corresponding pair of the plurality of decision statistics; and
at least one intermediate stage, each intermediate stage including a set of x wavelet filter pairs wherein x is twice the number of wavelet filter pairs of a preceding stage, wherein each wavelet filter pair has a pair of outputs and an input coupled to a corresponding one of a pair of outputs of a corresponding wavelet filter pair of a previous stage.

22. The OWDM communication system of claim 21, wherein each analysis section wavelet filter is followed by a set of down samplers.

23. The OWDM communication system of claim 12, wherein the channel interface comprises a media access control and physical circuit that is configured to communicate via a wireless medium.

24. The OWDM communication system of claim 12, wherein the adaptive equalizer includes a programmable equalizer that is initially adjusted based on reception of a plurality of predetermined transmitted OWDM signals during a training phase.

25. The OWDM communication system of claim 24, wherein the adaptive equalizer further comprises:
an adaptation block, coupled to the programmable equalizer and the detection block, that initially adjusts the programmable equalizer during the training phase and that updates the programmable equalizer based on the error signal during operation.

26. The OWDM communication system of claim 12, further comprising:
a parallel to serial converter having an input coupled to the output of the detection circuit that converts each estimated supersymbol into a stream of estimated symbols.

27. An orthogonal wavelet division multiplexing (OWDM) spread spectrum (OWSS) communication system, comprising:
a transmitter, comprising:
a first series of multipliers, each having a first input that receives a selected symbol of a predetermined symbol set of a selected modulation scheme, a second input that receives a corresponding code of a selected one of a first plurality of orthogonal code vectors and an output;
a second series of multipliers, each having a first input coupled to an output of a corresponding one of the first series of multipliers, a second input that receives a corresponding OWDM pulse of a first family of doubly orthonormal OWDM pulses and an output; and
a first adder having a plurality of inputs and an output, each input coupled to an output of the second series of multipliers and the output providing an OWSS signal; and
a channel interface, coupled to the output of the first adder, that is configured to assert the OWSS signal onto a channel.

28. The OWSS transceiver of claim 27, wherein the first family of doubly orthonormal OWDM pulses comprises broad-time pulses and wherein each code of the first plurality of orthogonal code vectors spread OWDM pulses so that the OWSS signal is a broad-time and broadband signal.

29. The OWSS communication system of claim 28, wherein the selected modulation scheme is a Quadrature Amplitude Modulation (QAM) scheme.

30. The OWSS communication system of claim 29, wherein the selected modulation scheme is QAM-64.

31. The OWSS communication system of claim 27, further comprising:
a memory, coupled to the transmitter, that stores the first plurality of orthogonal code vectors and a digital representation of the first family of doubly orthonormal OWDM pulses.

32. The OWSS communication system of claim 27, wherein the channel interface comprises a media access control and physical device.

33. The OWSS communication system of claim 27, further comprising:
the channel interface being further configured to receive a channel-modified OWSS signal transmitted via the channel;
an adaptive equalizer, coupled to the channel interface, that uses an error signal to perform an inverse process of the channel to convert the channel-modified OWSS signal into an estimated OWSS signal;
a correlator bank and adder, comprising:
a third series of multipliers, each having a first input coupled to the output of the adaptive equalizer to receive the estimated OWSS signal, a second input that receives a corresponding OWDM pulse of a second family of doubly orthonormal OWDM pulses and an output, the second family of doubly orthonormal OWDM pulses comprising complex conjugates of the first family of doubly orthonormal OWDM pulses;

a fourth series of multipliers, each having a first input coupled to an output of a corresponding one of the third series of multipliers, a second input that receives a corresponding code of a selected one of a second plurality of orthogonal code vectors and an output; and a second adder having a plurality of inputs and an output, each input coupled to an output of the fourth series of multipliers and the output providing a decision statistic; and a detect and decision feedback (DFB) error block, having an input coupled to the output of the second adder and an output, that interprets the decision statistic based on the predetermined symbol set, that asserts an estimated symbol at the output, that measures an error of the estimated symbol and that asserts the error signal to the adaptive equalizer.

34. The OWSS communication system of claim 33, wherein each OWDM pulse of the first and second families of doubly orthonormal OWDM pulses are generated by a tree-structured wavelet filter pair bank.

35. The OWSS communication system of claim 34, wherein the tree-structured wavelet filter pair bank comprises a multistage filter bank of wavelet filter pairs.

36. The OWSS communication system of claim 33, wherein the first and second families of doubly orthonormal OWDM pulses comprises broad-time pulses.

37. The OWSS communication system of claim 33, wherein the second plurality of orthogonal code vectors is a modified version of the first plurality of orthogonal code vectors to improve performance.

38. The OWSS communication system of claim 33, wherein each code vector of the first and second plurality of orthogonal code vectors corresponds to one of a plurality of users.

39. The OWSS communication system of claim 33, wherein the first and second plurality of orthogonal code vectors are based on Walsh-Hadamard codes.

40. The OWSS communication system of claim 33, further comprising:

a memory, coupled to the correlator bank and adder, that stores the first and second plurality of orthogonal code vectors and digital representations of the first and second family of doubly orthonormal OWDM pulses.

41. The OWSS communication system of claim 33, further comprising:

the first and second plurality of orthogonal code vectors being the same; and a memory, coupled to the transmitter and the correlator bank and adder, that stores the plurality of orthogonal code vectors and a digital representation of the first and second families of doubly orthonormal OWDM pulses.

42. The OWSS communication system of claim 33, wherein the channel interface comprises a media access control and physical circuit that is configured to communicate via a wireless medium.

43. The OWDM communication system of claim 33, wherein the adaptive equalizer includes a programmable equalizer that is initially adjusted based on reception of at least one predetermined transmitted OWSS signals during a training phase.

44. The OWSS communication system of claim 43, wherein the adaptive equalizer further comprises:

an adaptation block, coupled to the programmable equalizer and the detect and DFB error block, that initially adjusts the programmable equalizer during the training phase and that uses the error signal that is provided by the detect and DFB error block for equalizer adaptation during operation.

45. The OWSS communication system of claim 33, wherein the adaptive equalizer further comprises:

a Forward Equalizer (FE);

a Decision Feedback Equalizer (DFE) coupled to the detect and DFB error block and the FE;

an adder coupled to the FE, the DFE and the correlator bank and adder; and an adaptation block, coupled to the detect and DFB error block, the FE and the DFE, that adjusts the FE and DFE during an initial training phase and that adjusts the FE and DFE using the error signal from the detect and DFB error block during operation.

46. An orthogonal wavelet division multiplexing (OWDM) spread spectrum (OWSS) communication system, comprising:

a first memory that stores a first set of OWSS pulses comprising a plurality of OWSS pulse vectors, each OWSS pulse vector comprising a combination of a selected code vector of a first set of orthogonal code vectors and a first family of doubly orthonormal OWDM pulses;

a transmitter, coupled to the first memory, that combines a symbol of a predetermined symbol set of a selected modulation scheme with a selected OWSS pulse vector from the first memory into an OWSS signal; and a channel interface, coupled to the transmitter, that is configured to assert the OWSS signal onto a channel.

47. The OWSS communication system of claim 46, wherein the channel interface comprises a media access control and physical circuit that is configured for wireless communications.

48. The OWSS communication system of claim 46, wherein the selected modulation scheme is Quadrature Amplitude Modulation (QAM).

49. The OWSS communication system of claim 46, wherein the selected modulation scheme is QAM-64.

50. The OWSS communication system of claim 46, wherein the transmitter includes a set of multipliers and an adder.

51. The OWSS communication system of claim 46, further comprising:

the channel interface further being configured to receive a channel-modified OWSS signal transmitted via the channel;

a second memory that stores a second set of OWSS pulses comprising a plurality of OWSS pulse vectors, each OWSS pulse vector comprising a combination of a selected code vector of a second set of orthogonal code vectors and a second family of doubly orthonormal OWDM pulses;

an adaptive equalizer, comprising:

a forward equalizer (FE), coupled to the channel interface, that converts the channel-modified OWSS signal into an equalized signal;

an adder, coupled to the forward equalizer, that subtracts a feedback signal from the equalized signal and asserts an estimated OWSS signal;

a decision feedback equalizer (DFE), coupled to the adder, that receives estimated symbols and that provides the feedback signal to the adder; and an adaptation block, coupled to the FE and the DFE, that uses an error signal to update the FE and DFE;

a correlator, coupled to the second memory and the adaptive equalizer, that combines the estimated OWSS signal with a selected OWSS pulse vector from the second memory and that asserts a decision statistic at its output; and a detector and decision feedback (DFB) error block, coupled to the correlator, that interprets the decision statistic based on the predetermined symbol set, that provides the estimated symbol, that measures an error of the estimated symbol and that asserts the error signal.

52. The OWSS communication system of claim 51, further comprising:

a delay device inserted between the adder and correlator.

53. The OWSS communication system of claim 51, wherein the first and second orthogonal code vectors are the same, the first and second families of doubly orthonormal OWDM pulses are the same and the first and second sets of OWSS pulse vectors are the same.

54. The OWSS communication system of claim 53, wherein the first and second memories comprise a single memory.

55. The OWSS communication system of claim 51, wherein the correlator comprises a plurality of multipliers that generate a plurality of partial decision statistics and an adder that sums the plurality of partial decision statistics into the asserted decision statistic.

56. The OWSS communication system of claim 51, wherein the FE and DFE are initially adjusted by the adaptation block based on reception of a plurality of predetermined OWSS symbols during a training phase.

57. The OWSS communication system of claim 56, wherein the adaptation block further adjusts the FE and DFE during operation.

58. The OWSS communication system of claim 51, wherein each code vector of the first and second sets of orthogonal code vectors corresponds to one user of a plurality of users.

* * * * *